United States Patent
Yamamoto

(10) Patent No.: US 11,911,947 B2
(45) Date of Patent: Feb. 27, 2024

(54) INJECTION MOLDING MACHINE, ADDITIVE MANUFACTURING APPARATUS, AND PRESSURE CONTROL METHOD

(71) Applicant: TOYOTA JIDOSHA KABUSHIKI KAISHA, Toyota (JP)

(72) Inventor: Yasuhiro Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/655,283

(22) Filed: Mar. 17, 2022

(65) Prior Publication Data
US 2022/0314513 A1    Oct. 6, 2022

(30) Foreign Application Priority Data
Mar. 30, 2021  (JP) .................. 2021-058208

(51) Int. Cl.
| | | |
|---|---|---|
| *B29C 45/77* | (2006.01) | |
| *B29C 45/20* | (2006.01) | |
| (Continued) | | |

(52) U.S. Cl.
CPC ........... *B29C 45/77* (2013.01); *B29C 45/20* (2013.01); *B29C 45/30* (2013.01); *B29C 45/53* (2013.01);
(Continued)

(58) Field of Classification Search
CPC ... B29C 64/118; B29C 64/209; B29C 64/386; B29C 64/393; B33Y 50/00–02
See application file for complete search history.

(56) References Cited

U.S. PATENT DOCUMENTS

| | | | |
|---|---|---|---|
| 2015/0115491 A1 | 4/2015 | Altonen et al. | |
| 2016/0114509 A1* | 4/2016 | Kawasaki | B29C 45/74 425/550 |

(Continued)

FOREIGN PATENT DOCUMENTS

| | | |
|---|---|---|
| CN | 109982849 A | 7/2019 |
| DE | 102016009434 A1 * | 2/2018 |

(Continued)

OTHER PUBLICATIONS

Künne machine translation, 2016 (created 2023) (Year: 2016).*

(Continued)

*Primary Examiner* — Philip C Tucker
*Assistant Examiner* — Andrew L Swanson
(74) *Attorney, Agent, or Firm* — Oblon, McClelland, Maier & Neustadt, L.L.P.

(57) ABSTRACT

An injection molding machine includes a cylinder that accommodates a molten resin, a discharging nozzle, a piston that discharges the molten resin from the discharging nozzle, and one or more processors configured to execute the following functions. The functions include calculating a target pressure at which a flow rate of the molten resin discharged from the discharging nozzle becomes an indicated flow rate, controlling a pressure of the molten resin in the cylinder such that the pressure becomes the target pressure, acquiring a temperature of the molten resin in the cylinder, and acquiring a pseudo-plastic viscosity corresponding to the temperature of the molten resin. The target pressure is calculated based on the indicated flow rate, the temperature of the molten resin, the pseudo-plastic viscosity, and the size of the discharging nozzle.

10 Claims, 27 Drawing Sheets

(51) Int. Cl.
*B29C 45/30* (2006.01)
*B29C 45/53* (2006.01)
*B29C 45/76* (2006.01)
*B29C 45/78* (2006.01)
*B29C 64/209* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC .......... *B29C 45/7646* (2013.01); *B29C 45/78* (2013.01); *B29C 64/209* (2017.08); *B29C 64/393* (2017.08); *B29C 2945/7604* (2013.01); *B29C 2945/7605* (2013.01); *B29C 2945/76056* (2013.01); *B29C 2945/76204* (2013.01); *B29C 2945/76381* (2013.01); *B29C 2945/76498* (2013.01); *B29C 2945/76682* (2013.01); *B29C 2945/76859* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2017/0008230 A1 | 1/2017 | Yuyama | |
| 2017/0050374 A1* | 2/2017 | Minardi | ................ B33Y 10/00 |
| 2018/0281280 A1* | 10/2018 | Solorzano | ............ C12N 5/0062 |
| 2018/0297288 A1 | 10/2018 | Barbati et al. | |
| 2019/0134905 A1* | 5/2019 | Mire | ...................... B33Y 40/00 |
| 2020/0189187 A1* | 6/2020 | Streicher | ................. B29C 64/20 |
| 2020/0238680 A1* | 7/2020 | Kroes | ................... B29C 64/118 |
| 2021/0154916 A1* | 5/2021 | Kazmer | ................. B33Y 50/02 |
| 2021/0308937 A1* | 10/2021 | Broach | ................. B29C 64/245 |

FOREIGN PATENT DOCUMENTS

| | | |
|---|---|---|
| JP | 5-16195 A | 1/1993 |
| JP | 10-315290 A | 12/1998 |
| JP | 2001-260175 A | 9/2001 |
| JP | 4166746 B2 | 10/2008 |
| JP | 5920859 B2 | 5/2016 |
| JP | 6657550 B2 | 3/2020 |
| WO | WO 2019/113364 A1 | 6/2019 |
| WO | WO 2020/068066 A1 | 4/2020 |
| WO | WO-2021013749 A1 * | 1/2021 ........... B29C 64/118 |

OTHER PUBLICATIONS

U.S. Appl. No. 17/450,296, filed Oct. 8, 2021, Yamamoto, Y.
Rodriguez-Anton, L. M. et al., "High Pressure Physical Properties of Fluids used in Diesel Injection Systems," SAE Technical Paper Series 2000-01-2046, Jun. 19-22, 2000 (13 pages).

* cited by examiner

FIG. 5
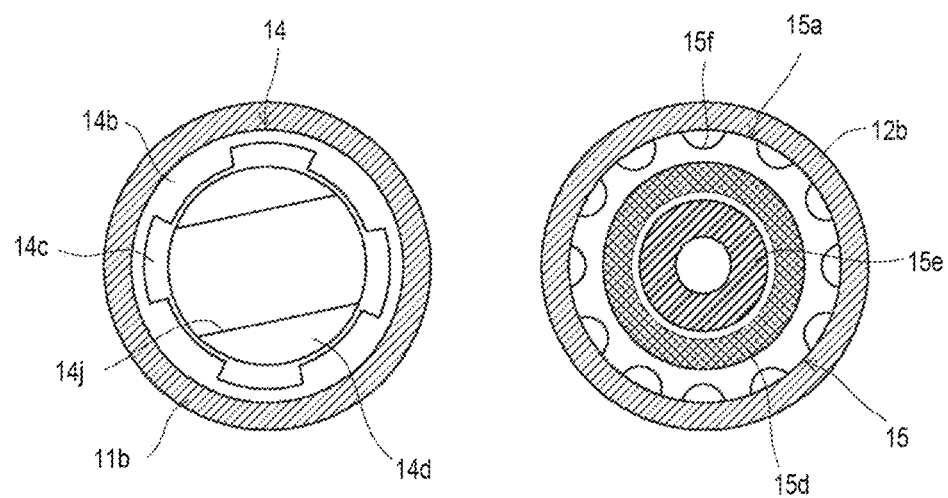
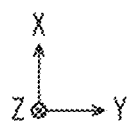

GRAPH OF RELATIONSHIP
BETWEEN NOZZLE MOVEMENT SPEED AND INDICATED FLOW RATE

GRAPH OF RELATIONSHIP
BETWEEN NOZZLE MOVEMENT SPEED AND INDICATED FLOW RATE

FIG. 17

| RESIN NAME | POWER INDEX n |
|------------|---------------|
| ABS | 0.25 |
| PC | 0.7 |
| PP | 0.35 |
| PA6 | 0.7 |

POWER INDEX OF REPRESENTATIVE EXAMPLE OF RESIN TO BE USED

NUMERICAL TABLE USED FOR CALCULATING BULK MODULUS $$K = \Delta P/(\Delta V/V_0)$$

| ΔP(MPa) | PC_200°C | PC_240°C | POM_200°C | POM_240°C |
|---|---|---|---|---|
| 10.05 | 737 | 904 | 834 | 714 |
| 30 | 1320 | 1350 | 1465 | 1162 |
| 50 | 1760 | 1500 | 1886 | 1578 |
| 80 | 1760 | 1600 | 1897 | 1623 |
| 130 | 2288 | 1671 | 2158 | 1786 |

VALUE USED FOR INITIAL VALUE IN FIRST EXAMPLE (K = 834MPa)

CALCULATION OF BULK MODULUS

L: LENGTHS OF ALL NOZZLES = 2mm    D = A*C/4L         X = 32B/(πA^3)   Y = X/A*10^6

| EXAMPLE A | EXAMPLE B | EXAMPLE C | EXAMPLE D |
|---|---|---|---|
| NOZZLE DIAMETER (mm) | FLOW RATE (mm³/s) | PRESSURE (MPa) | SHEAR STRESS (MPa) |
| 0.5 | 9 | 4.0 | 0.25 |
| 0.5 | 16 | 6.0 | 0.38 |
| 0.5 | 25 | 6.5 | 0.41 |
| 0.5 | 31 | 6.7 | 0.42 |
| 0.5 | 50 | 7.5 | 0.47 |
| 0.5 | 94 | 9.7 | 0.61 |
| 0.5 | 157 | 12.4 | 0.78 |
| 0.5 | 220 | 14.6 | 0.92 |
| 2.0 | 16 | 0.3 | 0.08 |
| 2.0 | 31 | 0.4 | 0.10 |
| 2.0 | 126 | 1.6 | 0.40 |
| 2.0 | 157 | 1.6 | 0.40 |
| 2.0 | 283 | 2.5 | 0.64 |

| X-AXIS | Y-AXIS |
|---|---|
| SHEAR VELOCITY (/s) | MELTING VISCOSITY (Pa·s) |
| 768 | 324 |
| 1,280 | 295 |
| 2,048 | 199 |
| 2,560 | 165 |
| 4,096 | 114 |
| 7,680 | 79 |
| 12,800 | 61 |
| 17,920 | 51 |
| 20 | 3979 |
| 40 | 2387 |
| 160 | 2487 |
| 200 | 2009 |
| 360 | 1768 |

EXAMPLE IN WHICH RELATIONSHIP BETWEEN PRESSURE AND FLOW RATE IS
CONVERTED INTO SHEAR VELOCITY AND MELTING VISCOSITY
(RESIN NAME: ABS, TEMPERATURE: 210°C)

EXAMPLE OF OBTAINING CONSTANT k DETERMINED BY
TEMPERATURE OF EACH RESIN
(RESIN NAME: ABS, TEMPERATURE: 210°C)

FIG. 28

CALCULATION SHEET OF INDICATED SPEED FOR FIRST TO THIRD CYCLES

| A | B | C | D | E | F | G | H | I | J | K | L | M | N | O |
|---|---|---|---|---|---|---|---|---|---|---|---|---|---|---|
| | | TARGET PRESSURE (ADJUSTED) | INDICATED SPEED $V_f = Q_p/\Delta t/S + \Delta P^*V/K/\Delta t/S$ BY $V_f^* \Delta t^* S = Q_p + \Delta P^*V/K$ | POSITION | TOTAL VOLUME | PISTON MOVEMENT AMOUNT | CALCULATE PREDICTED FLOW RATE USING POWER LAW $Q_p^* \Delta t$ | $\Delta V_p = \Delta V - Q$ (COMPRESSED VOLUME) | BULK MODULUS FOR PREDICTION | ACTUALLY MEASURED PRESSURE $P_f$ (ADJUSTED) | PRESSURIZATION AMOUNT | $K' = (P_f - P_{f-1})/(\Delta V_p/V)$ | $V_{rq}$ (FLOW RATE PORTION) | $V_{rp}$ (PRESSURIZED PORTION) |
| | TIME(s) | $P_{ti}$(MPa) | $V_f$(mm/s) | $X_f$(mm) | $V$(mm³) | $\Delta V$(mm³) | $Q_p$(mm³) | $\Delta V_p$(mm³) | K(MPa) | $P_f$(MPa) | $\Delta P$(MPa) | MODIFIED K'(MPa) | mm/s | mm/s |
| CYCLE0 | 0.0 | 2.00 | | 25.00 | | | | | | 0.000 | | | | |
| CYCLE1 | 0.1 | 2.00 | 0.647 | 24.94 | 8478.1 | 20.33 | 0.00 | 20.33 | 834.0 | 1.450 | 2.00 | 834.0 | 0.000 | 0.647 |
| CYCLE2 | 0.2 | 2.00 | 0.348 | 24.90 | 8457.7 | 10.94 | 3.25 | 7.69 | 604.6 | 1.950 | 0.55 | 604.6 | 0.103 | 0.245 |
| CYCLE3 | 0.3 | 2.00 | 0.363 | 24.85 | 8446.8 | 11.39 | 10.62 | 0.77 | 549.7 | 2.020 | 0.05 | 769.6 | 0.338 | 0.024 |

FIG. 29

CALCULATION SHEET OF INDICATED SPEED FOR FIRST TO THIRD CYCLES

| A | B | C | D = N+O | E | F | G | H | I | J | K | L | M | N | O |
|---|---|---|---|---|---|---|---|---|---|---|---|---|---|---|
| | | TARGET PRESSURE (ADJUSTED) | INDICATED FLOW RATE $V_r = Q_p/\Delta t/S + \Delta P^*V/K/\Delta t/S$ BY $V_r^*\Delta t^*S = Q_p + \Delta P^*V/K$ | POSITION | TOTAL VOLUME | PISTON MOVEMENT AMOUNT | CALCULATE PREDICTED FLOW RATE USING POWER LAW $Q_p^*\Delta t$ | $\Delta V_p = \Delta V - Q$ (COMPRESSED VOLUME) | BULK MODULUS FOR PREDICTION | ACTUALLY MEASURED PRESSURE $P_r$ (ADJUSTED) | PRESSURIZATION AMOUNT | $K = (P_r - P_{r-1})/(\Delta V_p/V)$ MODIFIED K (MPa) | $V_q$ (FLOW RATE PORTION) | $V_{rp}$ (PRESSURIZED PORTION) |
| | TIME(s) | $P_t$(MPa) | $V_r$(mm/s) | $X_r$(mm) | V(mm³) | $\Delta V$(mm³) | $Q_p$(mm³) | $\Delta V_p$(mm³) | K(MPa) | $P_r$(MPa) | $\Delta P$(MPa) | | mm/s | mm/s |
| CYCLE0 | 0.0 | 0.09 | | 25.00 | | | | | | 0.000 | | | | |
| CYCLE1 | 0.1 | 0.09 | 0.029 | 25.00 | 212049.5 | 22.88 | 0.00 | 22.88 | | 0.046 | 0.09 | 834.0 | 0.000 | 0.029 |
| CYCLE2 | 0.2 | 0.09 | 0.178 | 24.98 | 212026.7 | 139.75 | 117.86 | 21.89 | 834.0 | 0.089 | 0.04 | 426.3 | 0.150 | 0.028 |
| CYCLE3 | 0.3 | 0.09 | 2.104 | 24.77 | 211886.9 | 1652.14 | 1651.63 | 0.51 | 426.3 | 0.090 | 0.00 | 416.6 | 2.103 | 0.001 |
| | | | | | | | | | 416.6 | | | 416.6 | | |

INJECTION MOLDING MACHINE, ADDITIVE MANUFACTURING APPARATUS, AND PRESSURE CONTROL METHOD

CROSS-REFERENCE TO RELATED APPLICATION

This application claims priority to Japanese Patent Application No. 2021-058208 filed on Mar. 30, 2021, incorporated herein by reference in its entirety.

BACKGROUND

1. Technical Field

The present disclosure relates to an injection molding machine, an additive manufacturing apparatus, and a pressure control method.

2. Description of Related Art

In a torpedo-type resin discharging device, it is necessary to control a flow rate of a resin discharged from a discharging hole. For example, Japanese Unexamined Patent Application Publication No. 5-016195 (JP 5-016195 A) discloses a technology for controlling an injection flow rate in consideration of a pressure in an injection machine or an extrusion position of a plunger when filling a mold with a resin material using a nozzle.

SUMMARY

However, when discharging a resin using a 3D printer and the like, it is executed corresponding to various grades and temperatures of resin, and thus modeling is highly accurately executed as compared with when discharging the resin to the mold and the like as in JP 5-016195 A. Therefore, it is necessary to more accurately calculate a discharged flow rate. Here, the present inventors have found a shortcoming in that, even when discharging is executed at the same pressure, the discharged flow rate varies depending on a grade, a temperature, or a nozzle size of a resin.

The present disclosure provides an injection molding machine, an additive manufacturing apparatus, and a pressure control method that calculate a target pressure and control a discharged flow rate in consideration of a kind (grade), a temperature, and a nozzle size of a molten resin.

An injection molding machine according to a first aspect of the present disclosure includes a cylinder that accommodates a molten resin, a discharging nozzle that is communicated with the cylinder, a piston that discharges the molten resin from the discharging nozzle by sliding in the cylinder and pressurizing the molten resin in the cylinder, and one or more processors configured to execute functions. The functions include calculating a target pressure that is a target value used for pressurizing the molten resin in the cylinder and at which a flow rate of the molten resin discharged from the discharging nozzle becomes an indicated flow rate, controlling a pressure of the molten resin in the cylinder such that the pressure becomes the target pressure, acquiring a temperature of the molten resin in the cylinder, and acquiring a pseudo-plastic viscosity corresponding to the temperature of the molten resin. The target pressure is calculated based on the indicated flow rate, the temperature of the molten resin, the pseudo-plastic viscosity, and a size of the discharging nozzle.

With such a configuration, it is possible to calculate the target pressure in consideration of the kind (grade), the temperature, and the nozzle size of the molten resin, and control the discharged flow rate. This is because a pressure control unit that controls the pressure of the molten resin in the cylinder such that the pressure thereof becomes the target pressure is included. Further, it is possible to accurately control the discharged flow rate of the resin by calculating the target pressure of the molten resin using the pseudo-plastic viscosity that varies depending on the temperature.

In the first aspect, the one or more processors may acquire the pseudo-plastic viscosity corresponding to the kind and the temperature of the molten resin.

In this manner, even when a plurality of resin kinds is used, it is possible to accurately control the discharged flow rate of the resin by calculating the target pressure of the molten resin using the pseudo-plastic viscosity that varies depending on the temperature.

In the first aspect, the injection molding machine may further include a memory that stores the pseudo-plastic viscosity for each kind and temperature of resins in advance. The one or more processors may acquire, from the memory, the pseudo-plastic viscosity corresponding to the kind and the temperature of the molten resin. In this manner, it is possible to reduce a calculation load when calculating the target pressure by storing in advance the pseudo-plastic viscosity for each kind and temperature of resins to be used. Further, it is possible to quickly obtain a target indicated flow rate from a cycle at which the discharging is started.

In the first aspect, the one or more processors may control the pressure of the molten resin in the cylinder by controlling a movement speed of the piston such that the pressure becomes the target pressure.

In the first aspect, the one or more processors may execute feed-forward control of the movement speed of the piston using a bulk modulus of the molten resin.

In this manner, it is possible to more accurately control the target pressure by calculating using the bulk modulus of the molten resin.

In the first aspect, the one or more processors may further execute the feed-forward control of the movement speed of the piston which is calculated based on a predicted flow rate.

In this manner, it is possible to control the discharged flow rate without measuring an actual outflow rate, by calculating a predicted outflow rate from an actually measured pressure and calculating the indicated movement speed of the piston. Thus, it is possible to control the discharged flow rate while operating the injection molding machine.

In the first aspect, the one or more processors may modify the bulk modulus based on a pressure change amount calculated from an actually measured pressure and a substantially pressurized volume.

In this manner, it is possible to highly accurately obtain a flow rate according to a condition of air entraining into the molten resin.

In the first aspect, the one or more processors may modify the bulk modulus only when a difference between the actually measured pressure and the target pressure is equal to or higher than a predetermined value.

In this manner, it is possible to modify the bulk modulus only when it is necessary to correct a value of the bulk modulus.

In the first aspect, the piston may be a torpedo.

In the first aspect, the injection molding machine may include a plurality of combinations of the cylinders and the pistons.

An additive manufacturing apparatus according to a second aspect of the present disclosure includes the injection molding machine. The additive manufacturing apparatus is configured to model a three-dimensional modeled object by laminating the molten resin discharged from the discharging nozzle.

A pressure control method according to a third aspect of the present disclosure controls a pressure of a molten resin in a cylinder of an injection molding machine. The injection molding machine includes the cylinder that accommodates the molten resin, a discharging nozzle that is communicated with the cylinder, and a piston configured to discharge the molten resin from the discharging nozzle by sliding in the cylinder and pressurizing the molten resin in the cylinder. The pressure control method includes calculating a target pressure which is a target value used for pressurizing the molten resin in the cylinder and at which a flow rate of the molten resin discharged from the discharging nozzle becomes an indicated flow rate and controlling a pressure of the molten resin in the cylinder such that the pressure becomes the target pressure.

With each aspect of the present disclosure, it is possible to provide an injection molding machine, an additive manufacturing apparatus, and a pressure control method that calculate a target pressure and control a discharged flow rate in consideration of a kind (grade), a temperature, and a nozzle size of a molten resin.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a cross-sectional view taken along a line V-V of FIG. 1;

FIG. 17 is an example (a representative example) of a power index;

FIG. 18A is an example of a numerical table used for calculating a bulk modulus;

FIG. 18B is a graph in which FIG. 18A is plotted;

FIG. 28 is a table displaying a summary of simulation results (first to third cycles) of the first example; and FIG. 29 is a table displaying a summary of simulation results (the first to the third cycles) of the second example.

DETAILED DESCRIPTION OF EMBODIMENTS

Hereinafter, specific embodiments to which the present disclosure is applied will be described in detail with reference to drawings. However, the present disclosure is not limited to the embodiments below. Further, to clarify description, the description and drawings below will be appropriately simplified.

First Embodiment

Figure 1:
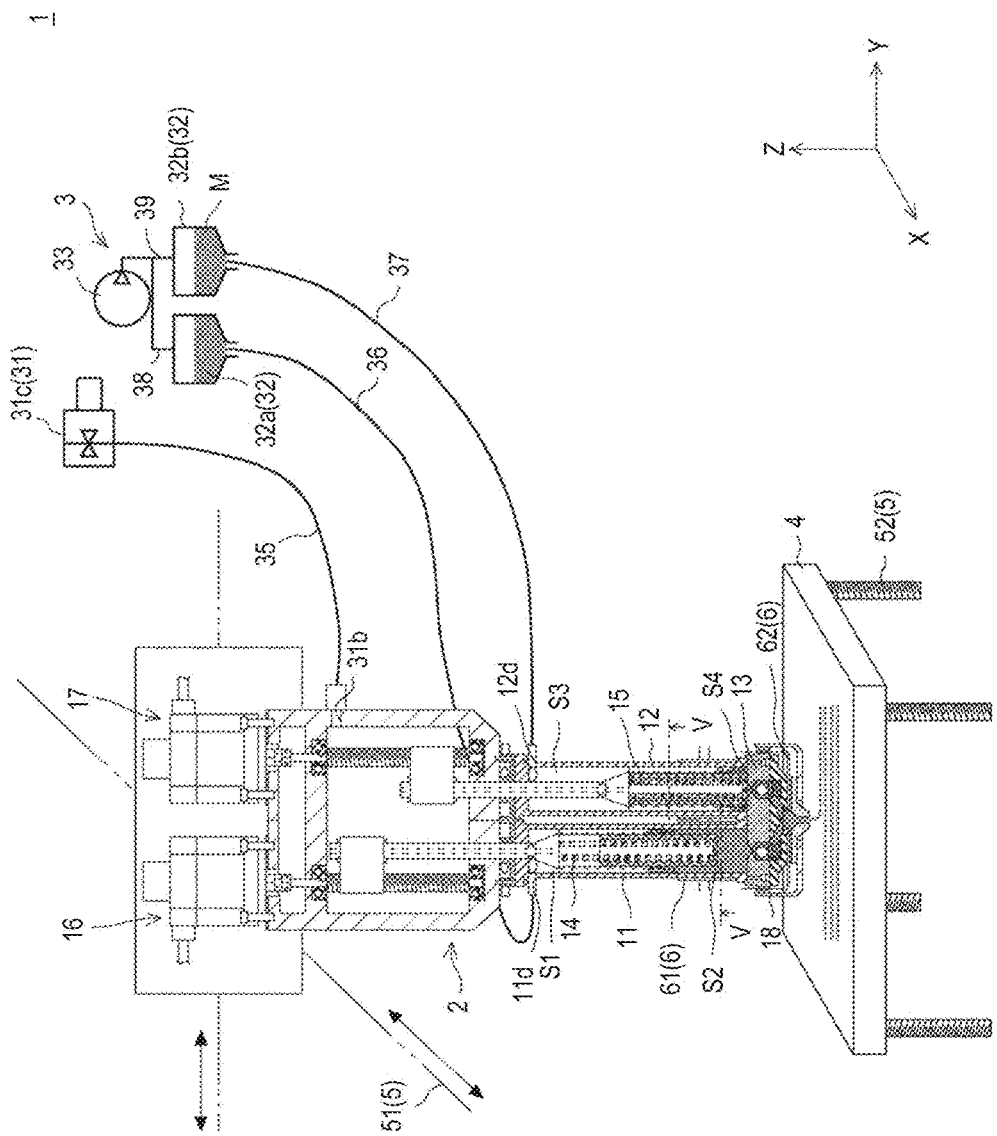
FIG. 1 is a diagram schematically illustrating an injection molding apparatus according to a first embodiment.
Figure 2:
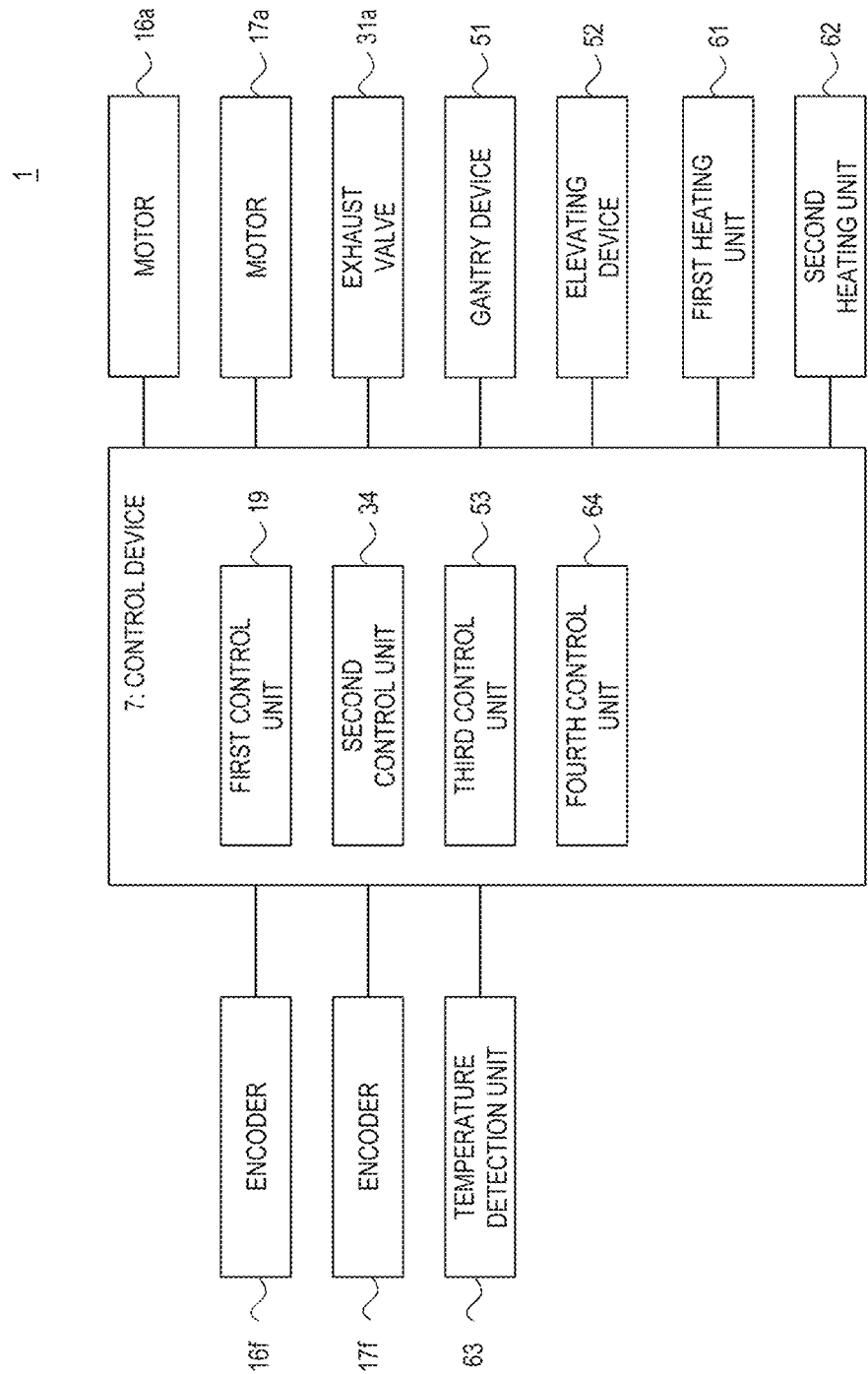
FIG. 2 is a block diagram of a control system of the injection molding apparatus according to the first embodiment.

First, a configuration of an injection molding apparatus according to the present embodiment will be described. The injection molding apparatus according to the present embodiment is suitable for laminating and modeling a workpiece using an injection molding machine. FIG. 1 is a diagram schematically illustrating the injection molding apparatus according to the present embodiment. FIG. 2 is a block diagram of a control system of the injection molding apparatus according to the present embodiment. In the description below, to clarify the description, a three-dimensional (XYZ) coordinate system will be used.

Figure 3:
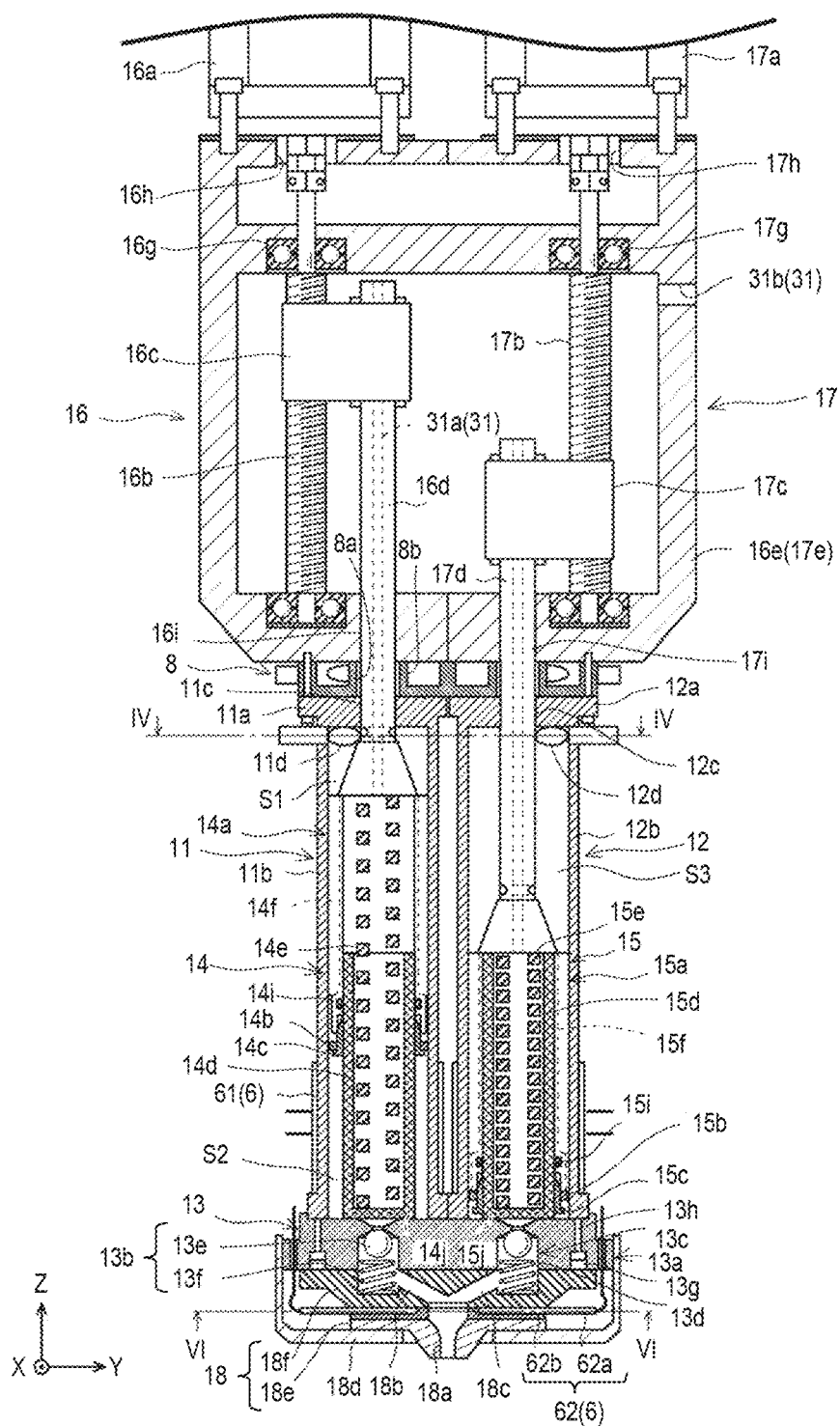
FIG. 3 is a diagram illustrating an enlarged part on a minus side of a Z-axis of an injection molding machine according to the first embodiment.
Figure 4:
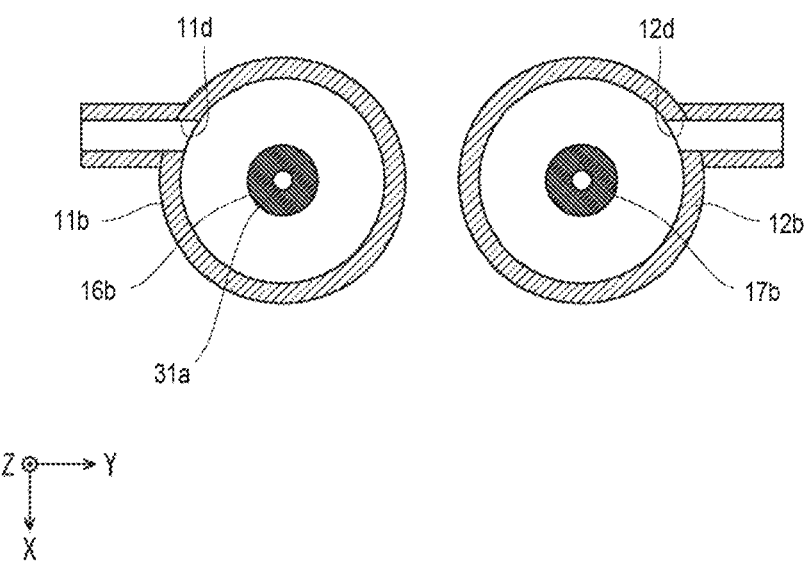
FIG. 4 is a cross-sectional view taken along a line IV-IV of FIG. 3.
Figure 6:
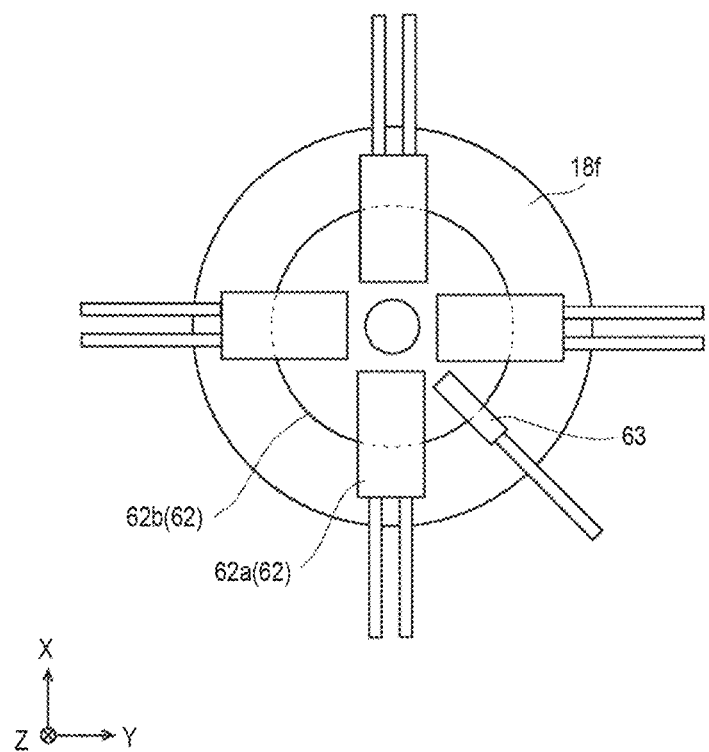
FIG. 6 is a cross-sectional view taken along a line VI-VI of FIG. 3.

As illustrated in FIGS. 1 and 2, an injection molding apparatus 1 includes an injection molding machine 2, a supply device 3, a table 4 (hereinafter, also referred to as a base plate 4), a moving device 5, a heating device 6, and a control device 7. The injection molding machine 2 may be configured to be, for example, capable of continuously injecting a molten resin. FIG. 3 is a diagram illustrating an enlarged part on a minus side of a Z-axis of the injection molding machine 2 according to the present embodiment. FIG. 4 is a cross-sectional view taken along a line IV-IV of FIG. 3. FIG. 5 is a cross-sectional view taken along a line V-V of FIG. 1. FIG. 6 is a cross-sectional view taken along a line VI-VI of FIG. 3.

As illustrated in FIGS. 1 to 3, the injection molding machine 2 includes a first cylinder 11, a second cylinder 12, an end plate 13, a first piston unit 14, a second piston unit 15, a first drive unit 16, a second drive unit 17, an injection portion 18, and a first control unit 19.

As illustrated in FIG. 3, the first cylinder 11 extends in the Z-axis direction, and has, as a basic form, a topped cylinder shape in which the end on a plus side of the Z-axis of the first cylinder 11 is closed. In other words, the first cylinder 11 includes a closed portion 11a arranged on the plus side of the Z-axis and a tubular-shaped side wall portion 11b continuous with a peripheral edge portion of the closed portion 11a and extending from the closed portion 11a to the minus side of the Z-axis. The end on the minus side of the Z-axis of the first cylinder 11 is open.

As illustrated in FIG. 3, a through hole 11c that penetrates the closed portion 11a in the Z-axis direction is formed in the closed portion 11a of the first cylinder 11. Further, as illustrated in FIGS. 3 and 4, a supply hole 11d to which a resin raw material is supplied is formed in a portion on the plus side of the Z-axis in the side wall portion 11b of the first cylinder 11. The resin raw material may be, for example, resin pellets (plural).

As illustrated in FIGS. 3 and 4, the second cylinder 12 extends in the Z-axis direction and is in parallel with the first cylinder 11 in the Y-axis direction. Since the second cylinder 12 has the same configuration as that of the first cylinder 11, duplicate description thereof will be omitted, but the second cylinder 12 includes a closed portion 12a having a through hole 12c and a side wall portion 12b having a supply hole 12d. The end on the minus side of the Z-axis of the second cylinder 12 is open.

As illustrated in FIG. 3, the end plate 13 is fixed to the ends on the minus side of the Z-axis of the first cylinder 11 and the second cylinder 12. The end plate 13 includes a main body 13a and a check valve 13b. The main body 13a may have, for example, a plate shape as a basic form, and through holes 13c are formed at intervals in the Y-axis direction.

As illustrated in FIG. 3, the through hole 13c penetrates the main body 13a in the Z-axis direction, and includes an accommodating portion 13d that accommodates the check valve 13b in a portion on the minus side of the Z-axis of the through hole 13c. A surface on the plus side of the Z-axis of the accommodating portion 13d is an inclined surface that inclines toward the minus side of the Z-axis as it goes outward from the center of the through hole 13c.

At this time, a portion on the plus side of the Z-axis of the through hole 13c includes an inclined surface that inclines toward the plus side of the Z-axis as it goes outward from the center of the through hole 13c, and the end on the minus side of the Z-axis of the inclined surface is continuous with a portion on the plus side of the Z-axis of the accommodating portion 13d.

The check valve 13b allows the molten resin to flow to the minus side of the Z-axis and blocks the molten resin from flowing to the plus side of the Z-axis. The check valve 13b can be composed of, for example, a check valve, and, as illustrated in FIG. 3, includes a check ball 13e and a spring 13f. Here, an elastic force of the spring 13f is appropriately set such that the check valve 13b is opened when a pressure set in advance is applied to the check ball 13e.

As illustrated in FIG. 3, the end plate 13 is fixed to the ends on the minus side of the Z-axis of the first cylinder 11 and the second cylinder 12 via bolts 13h that pass through bolt holes 13g formed in the main body 13a such that the end plate 13 covers respective openings on the minus side of the Z-axis of the first cylinder 11 and the second cylinder 12.

At this time, the through hole 13c on the minus side of a Y-axis in the end plate 13 is arranged on the minus side of the Z-axis with respect to the first cylinder 11, and the through hole 13c on the plus side of the Y-axis in the end plate 13 is arranged on the minus side of the Z-axis with respect to the second cylinder 12.

Here, a central axis of the through hole 13c on the minus side of the Y-axis in the end plate 13 and a central axis of the first cylinder 11 are arranged so as to substantially overlap with each other, and a central axis of the through hole 13c on the plus side of the Y-axis in the end plate 13 and a central axis of the second cylinder 12 are arranged so as to substantially overlap with each other.

Figure 7:
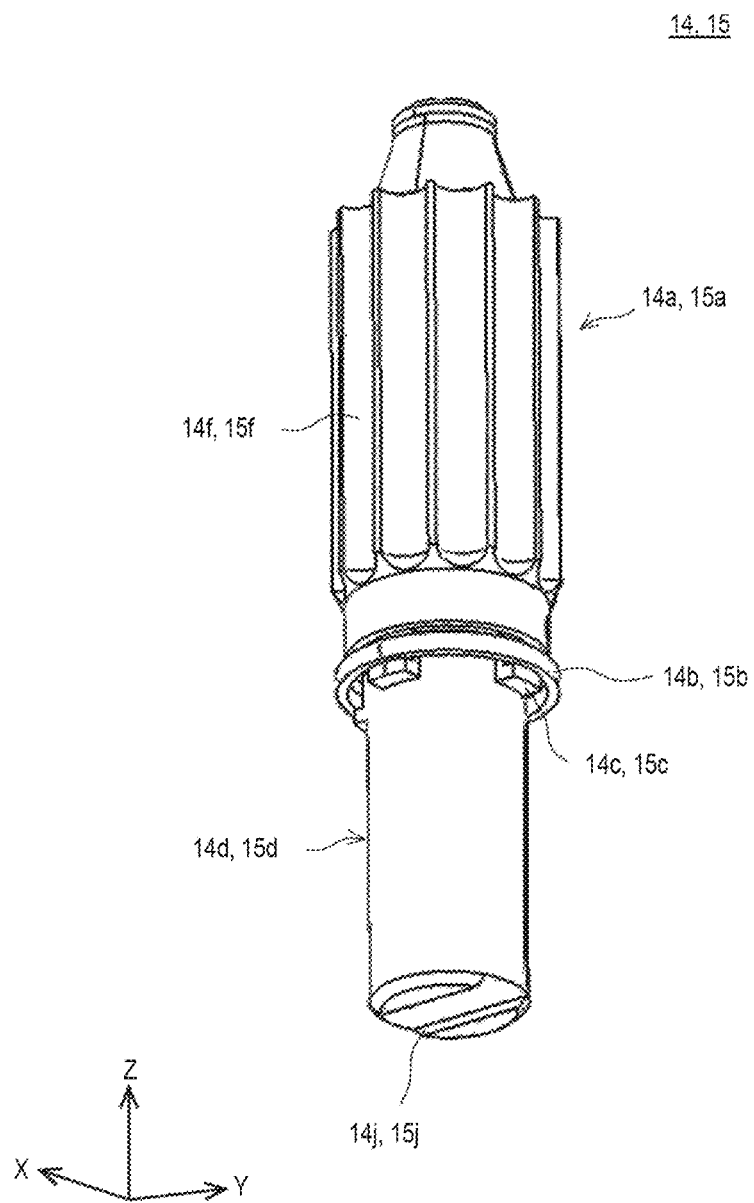
FIG. 7 is a perspective view illustrating a first piston unit and a second piston unit according to the first embodiment.
Figure 8:
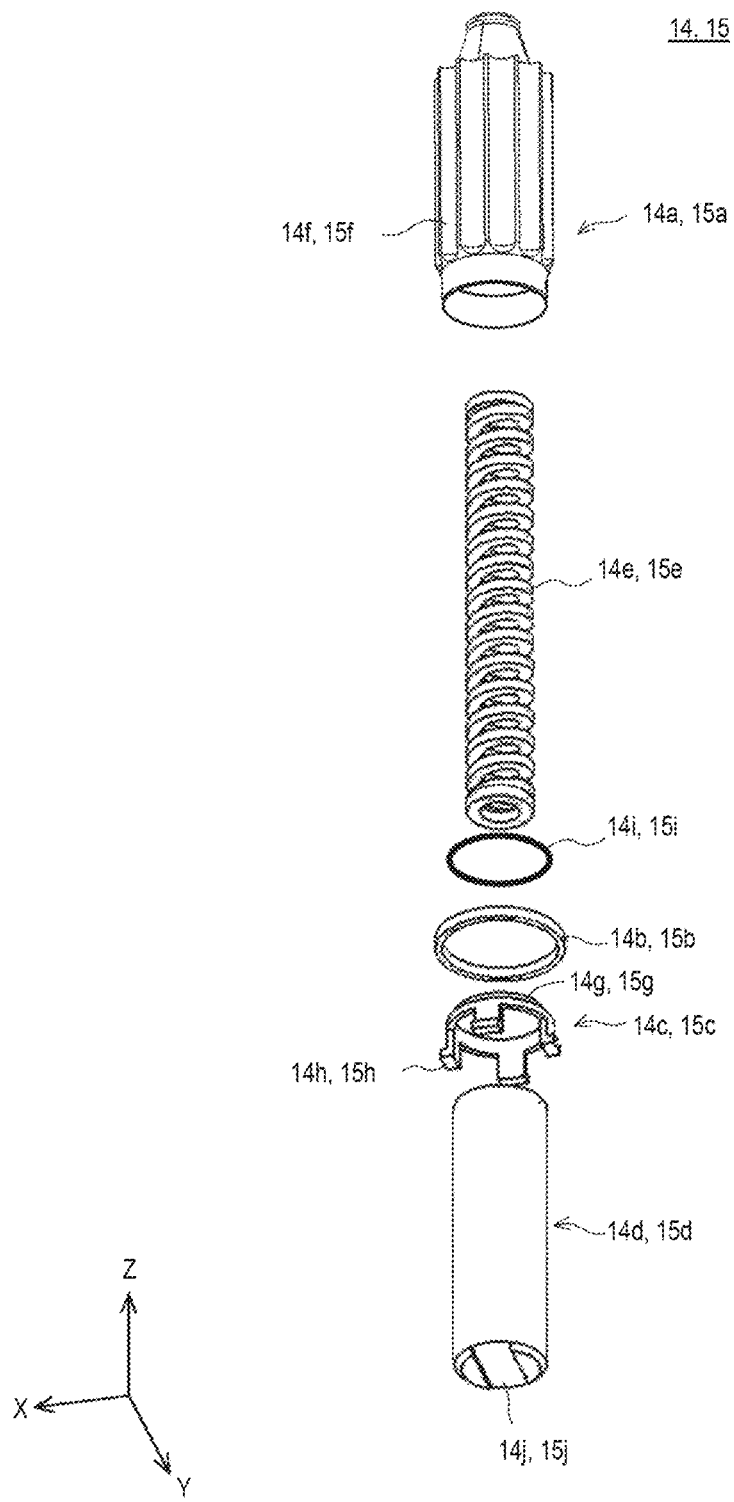
FIG. 8 is an exploded view illustrating the first piston unit and the second piston unit according to the first embodiment.

As illustrated in FIG. 3, the first piston unit 14 is arranged in the first cylinder 11 so as to be capable of sliding therein. FIG. 7 is a perspective view illustrating the first piston unit 14 and the second piston unit 15 according to the present embodiment. FIG. 8 is an exploded view illustrating the first piston unit 14 and the second piston unit 15 according to the present embodiment.

As illustrated in FIGS. 7 and 8, the first piston unit 14 includes a torpedo piston 14a, a check ring 14b, a stopper 14c, a pressurizing piston 14d, and a biasing tool 14e. The torpedo piston 14a has, as a basic form, a topped cylinder shape in which the end on the plus side of the Z-axis of the torpedo piston 14a is closed, and generally has an outer circumference shape corresponding to the inner circumference shape of the first cylinder 11. At this time, a surface on the plus side of the Z-axis of the torpedo piston 14a is an inclined surface that inclines toward the minus side of the Z-axis as it goes toward a peripheral edge portion from the center of the torpedo piston 14a.

As illustrated in FIGS. 7 and 8, groove portions 14f are formed on an outer circumferential surface of the torpedo piston 14a. The groove portions 14f extend in the Z-axis direction and are arranged at substantially equal intervals in the circumferential direction of the torpedo piston 14a.

However, as described below, the groove portions 14f are formed and arranged to be capable of plasticizing the resin raw material to form the molten resin when the resin raw material supplied to a first space S1 on the plus side of the Z-axis with respect to the first piston unit 14 in the first cylinder 11 passes through the groove portions 14f, and of causing the molten resin to flow into a second space S2 on the minus side of the Z-axis with respect to the first piston unit 14 in the first cylinder 11.

As illustrated in FIGS. 5, 7, and 8, the check ring 14b is ring-shaped having an outer circumference shape substantially equal to the inner circumference shape of the first cylinder 11, and is arranged on the minus side of the Z-axis with respect to the torpedo piston 14a. The stopper 14c holds the check ring 14b at the end on the minus side of the Z-axis of the torpedo piston 14a.

As illustrated in FIG. 8, the stopper 14c includes, for example, a ring portion 14g and hook portions 14h. The ring portion 14g has an outer circumference shape substantially equal to an inner circumference shape of the torpedo piston 14a. The hook portion 14h has a substantially L shape when viewed from a direction orthogonal to the Z-axis, and the end on the plus side of the Z-axis of a vertical portion of the hook portion 14h is fixed to the ring portion 14g.

As illustrated in FIG. 8, a horizontal portion of the hook portion 14h protrudes from the end on the minus side of the Z-axis of the vertical portion of the hook portion 14h toward the outside of the ring portion 14g. The hook portions 14h are arranged at substantially equal intervals in the circumferential direction of the ring portion 14g.

The ring portion 14g is fitted into an opening of the end on the minus side of the Z-axis of the torpedo piston 14a in a state where a vertical portion of the ring portion 14g and the vertical portions of the hook portions 14h pass through a through hole of the check ring 14b. As such, the check ring 14b is held at the end on the minus side of the Z-axis of the torpedo piston 14a via the stopper 14c.

At this time, a length of the vertical portion of the hook portion 14h in the Z-axis direction is longer than a thickness of the check ring 14b in the Z-axis direction. As such, the check ring 14b is movable in the Z-axis direction between the end on the minus side of the Z-axis of the first cylinder 11 and the horizontal portion of the hook portion 14h. However, the stopper 14c is configured to be capable of holding the check ring 14b at the end on the minus side of the Z-axis of the first cylinder 11 so as to be movable in the Z-axis direction.

As illustrated in FIGS. 7 and 8, the pressurizing piston 14d has a bottomed tubular shape in which the end on the minus side of the Z-axis of the pressurizing piston 14d is closed. For example, an end surface on the minus side of the Z-axis of the pressurizing piston 14d has a substantially flat surface parallel to an XY plane surface. Thus, an outer circumference shape of the pressurizing piston 14d is substantially equal to the inner circumference shape of the torpedo piston 14a.

As illustrated in FIG. 3, the pressurizing piston 14d is slidably inserted in the torpedo piston 14a in a state where space between an inner circumferential surface of the torpedo piston 14a and an outer circumferential surface of the pressurizing piston 14d is closed by a seal member 14i.

In other words, the inside of the torpedo piston 14a functions as a sliding portion of the pressurizing piston 14d, and when the pressurizing piston 14d slides in the Z-axis direction with respect to the torpedo piston 14a, a protrusion amount of the first cylinder 11 to the second space S2 with respect to the torpedo piston 14a is changed. A size, a maximum movement amount, or the like of an area surrounded by an outer circumferential edge of the pressurizing piston 14d will be described below.

At this time, although detailed functions will be described below, as illustrated in FIGS. 7 and 8, an invading portion 14j into which the molten resin intrudes is formed on the end surface on the minus side of the Z-axis of the pressurizing piston 14d. The invading portion 14j is a groove portion formed on, for example, the end surface on the minus side of the Z-axis of the pressurizing piston 14d and extending in a direction orthogonal to the Z-axis.

However, the invading portion 14j has a shape that enables the molten resin to intrude into space between the end surface on the minus side of the Z-axis of the pressurizing piston 14d and an end surface on the plus side of the Z-axis of the end plate 13 in a state where the end surface on the minus side of the Z-axis of the pressurizing piston 14d is in contact with the end surface on the plus side of the Z-axis of the end plate 13.

The biasing tool 14e biases the pressurizing piston 14d to the second space S2 side of the first cylinder 11 with respect to the torpedo piston 14a. As illustrated in FIG. 8, the biasing tool 14e may be, for example, an elastic member, such as a coil spring.

The biasing tool 14e is arranged in the pressurizing piston 14d in a state where the end on the plus side of the Z-axis of the biasing tool 14e comes into contact with the end on the plus side of the Z-axis of the torpedo piston 14a, and the end on the minus side of the Z-axis of the biasing tool 14e comes into contact with the end on the minus side of the Z-axis of the pressurizing piston 14d. A biasing force and the like of the biasing tool 14e will be described below.

As illustrated in FIG. 3, the second piston unit 15 is arranged in the second cylinder 12 so as to be slidable therein. Since the second piston unit 15 has the same configuration as that of the first piston unit 14, duplicate description thereof will be omitted, but, as illustrated in FIGS. 5, 7, and 8, the second piston unit 15 includes a torpedo piston 15a having groove portions 15f formed on an outer circumferential surface thereof, a check ring 15b, a stopper 15c having a ring portion 15g and a hook portion 15h, a pressurizing piston 15d, and a biasing tool 15e.

Thus, as illustrated in FIG. 3, the pressurizing piston 15d is slidably inserted in the torpedo piston 15a in a state where space between an inner circumferential surface of the torpedo piston 15a and an outer circumferential surface of the pressurizing piston 15d is closed by a seal member 15i. At this time, as illustrated in FIGS. 5, 7, and 8, an invading portion 15j into which the molten resin intrudes is also formed on the end surface on the minus side of the Z-axis of the pressurizing piston 15d.

The first drive unit 16 drives the first piston unit 14 in the Z-axis direction. As illustrated in FIG. 3, the first drive unit 16 includes a motor 16a, a screw shaft 16b, a slider 16c, a rod 16d, and a case 16e. The motor 16a may be, for example, a servomotor, and is fixed to the end on the plus side of the Z-axis of the case 16e. A rotation angle of an output shaft of the motor 16a is detected by an encoder 16f (see FIG. 2).

As illustrated in FIG. 3, the screw shaft 16b extends in the Z-axis direction and is rotatably supported via a bearing 16g in the case 16e. Thus, the end on the plus side of the Z-axis of the screw shaft 16b is connected to the output shaft in a state where the end on the plus side of the Z-axis of the screw shaft 16b passes through a through hole 16h formed at the end on the plus side of the Z-axis of the case 16e so as to be capable of transmitting a drive force from the output shaft of the motor 16a.

The slider 16c includes a screw hole, and the screw hole of the slider 16c is meshed with the screw shaft 16b such that the slider 16c moves along the screw shaft 16b in the case 16e. The screw shaft 16b and the slider 16c compose a ball screw and are accommodated in the case 16e.

As illustrated in FIG. 3, the rod 16d extends in the Z-axis direction and passes through a through hole 16i formed at the end on the minus side of the Z-axis of the case 16e and the through hole 11c of the first cylinder 11. The end on the plus side of the Z-axis of the rod 16d is fixed to the slider 16c and the end on the minus side of the Z-axis of the rod 16d is fixed to the end on the plus side of the Z-axis of the torpedo piston 14a of the first piston unit 14.

As illustrated in FIG. 3, the case 16e supports the motor 16a, the screw shaft 16b, the slider 16c, and the rod 16d. The case 16e may be, for example, box-shaped and a sealed space is formed therein. The closed portion 11a of the first cylinder 11 is fixed to the end on the minus side of the Z-axis of the case 16e.

The second drive unit 17 drives the second piston unit 15 in the Z-axis direction. Since the second drive unit 17 has the same configuration as that of the first drive unit 16, duplicate description thereof will be omitted, but, as illustrated in FIG. 3, the second drive unit 17 includes a motor 17a, a screw shaft 17b, a slider 17c, a rod 17d, and a case 17e.

In other words, the motor 17a is fixed to the end on the plus side of the Z-axis of the case 17e, and a rotation angle of an output shaft of the motor 17a is detected by an encoder 17f (see FIG. 2). As illustrated in FIG. 3, the screw shaft 17b is supported via a bearing 17g in the case 17e, and the end on the plus side of the Z-axis of the screw shaft 17b is connected to the output shaft of the motor 17a in a state where the end on the plus side of the Z-axis of the screw shaft 17b passes through a through hole 17h formed at the end on the plus side of the Z-axis of the case 17e.

A screw hole of the slider 17c is meshed with the screw shaft 17b such that the slider 17c moves along the screw shaft 17b in the case 17e. The rod 17d passes through a through hole 17i formed at the end on the minus side of the Z-axis of the case 17e and the through hole 12c of the second cylinder 12. Thus, the end on the plus side of the Z-axis of the rod 17d is fixed to the slider 17c, and the end on the minus side of the Z-axis of the rod 17d is fixed to the end on the plus side of the Z-axis of the torpedo piston 15a of the second piston unit 15.

As illustrated in FIG. 3, the case 17e supports the motor 17a, the screw shaft 17b, the slider 17c, and the rod 17d, and a sealed space is formed therein. Thus, the closed portion 12a of the second cylinder 12 is fixed to the end on the minus side of the Z-axis of the case 17e.

In the present embodiment, as illustrated in FIGS. 1 and 3, the case 17e is integrally formed with the case 16e of the first drive unit 16 to form a common sealed space. For this reason, in the description below, when the case 16e of the first drive unit 16 is illustrated, the case 17e of the second drive unit 17 may also be illustrated. However, the case 17e may be composed of a member different from that of the case 16e of the first drive unit 16.

The injection portion 18 is arranged on the minus side of the Z-axis with respect to the end plate 13 such that the molten resin extruded from the first cylinder 11 and the second cylinder 12 can be injected. As illustrated in FIG. 3, the injection portion 18 includes an injection port 18a that injects the molten resin (a resin discharging hole, it corresponds to a discharging nozzle of the present disclosure. Hereinafter, it is also referred to as a discharging nozzle 18a or a nozzle 18a), a first branch path 18b that is on the plus side of the Z-axis from the injection port 18a and extending to the minus side of the Y-axis, and a second branch path 18c that is on the plus side of the Z-axis from the injection port 18a and extending to the plus side of the Y-axis. Here, the injection port 18a has a shape that narrows as it goes toward the minus side of the Z-axis.

As illustrated in FIG. 3, the injection portion 18 is fixed to the end plate 13 via a retailing nut 18d. At this time, the end on the plus side of the Z-axis of the first branch path 18b communicates with the through hole 13c on the minus side of the Y-axis in the end plate 13, and the end on the plus side of the Z-axis of the second branch path 18c communicates with the through hole 13c on the plus side of the Y-axis in the end plate 13.

The injection portion 18 is divided into a first plate 18e in which the injection port 18a is formed and a second plate 18f in which the first branch path 18b and the second branch path 18c are formed. Although functions will be described below, at least one of the first plate 18e and the second plate 18f is composed of a ceramic plate. Here, the injection portion 18 can be formed with an accommodating portion that accommodates a part of the check valve 13b.

Although details will be described below, the first control unit 19 controls the motor 16a of the first drive unit 16 and the motor 17a of the second drive unit 17 based on detection results of the encoders 16f, 17f.

The supply device 3 supplies the resin raw material to the first cylinder 11 and the second cylinder 12. As illustrated in FIGS. 1 to 3, the supply device 3 includes an exhaust unit 31, a hopper 32, a pressurizing unit 33, and a second control unit 34. The exhaust unit 31 discharges gas from space surrounded by the first space S1 of the first cylinder 11, a first space S3 on the plus side of the Z-axis with respect to the second piston unit 15 in the second cylinder 12, the torpedo pistons 14a, 15a, and the pressurizing pistons 14d, 15d.

In more detail, the exhaust unit 31 includes an exhaust passage 31a, an exhaust hole 31b, and an exhaust valve 31c. As illustrated in FIG. 3, the exhaust passages 31a are formed in the rod 16d of the first drive unit 16 and the torpedo piston 14a, and in the rod 17d of the second drive unit 17 and the torpedo piston 15a, respectively. The exhaust passages 31a pass through the inside of the rods 16d, 17d, penetrate the ends on the plus side of the Z-axis of the torpedo pistons 14a, 15a, and extend in the Z-axis direction.

The ends on the minus side of the Z-axis of the exhaust passages 31a are branched to reach circumferential surfaces of the ends on the minus side of the Z-axis of the rods 16d, 17d and reach space surrounded by the torpedo pistons 14a, 15a and the pressurizing pistons 14d, 15d. The ends on the plus side of the Z-axis of the exhaust passages 31a reach the end surfaces on the plus side of the Z-axis of the rods 16d, 17d.

For this reason, the ends on the minus side of the Z-axis of the exhaust passages 31a communicate with space surrounded by the first space S1 of the first cylinder 11, the torpedo piston 14a, and the pressurizing piston 14d, or space surrounded by the first space S3 of the second cylinder 12, the torpedo piston 15a, and the pressurizing piston 15d, and the ends on the plus side of the Z-axis of the exhaust passages 31a are arranged in the case 16e of the first drive unit 16.

The exhaust hole 31b is formed in the case 16e of the first drive unit 16. However, when the case 16e of the first drive unit 16 and the case 17e of the second drive unit 17 are composed of different members from each other, the exhaust holes 31b are formed in the cases 16e, 17e, respectively. The exhaust valve 31c is connected to the exhaust hole 31b via an exhaust pipe 35. Examples of the exhaust valve 31c include an electromagnetic valve.

The hopper 32 accommodates a resin raw material M supplied to the first space S1 of the first cylinder 11 and the first space S3 of the second cylinder 12. In the present embodiment, as illustrated in FIG. 1, the hopper 32 includes a first hopper 32a and a second hopper 32b.

The first hopper 32a has a configuration having a sealable inside, and is connected to the supply hole 11d of the first cylinder 11 via a first supply pipe 36. The second hopper 32b has a configuration having a sealable inside, and is connected to the supply hole 12d of the second cylinder 12 via a second supply pipe 37.

The first hopper 32a and the second hopper 32b have a configuration in which the resin raw material M can be maintained in a dry state by a residual heat heater. As such, it is possible to restrict a modeling defect due to water vapor that is generated when the resin raw material M is plasticized.

Further, inner diameters of the supply hole 11d of the first cylinder 11, the supply hole 12d of the second cylinder 12, the first supply pipe 36, and the second supply pipe 37 are equal to or shorter than twice the length of a diagonal line of a resin pellet which is the resin raw material M.

As such, it is possible to restrict the resin raw material M from causing a bridge due to its lining up in the supply hole 11d of the first cylinder 11, the supply hole 12d of the second cylinder 12, the first supply pipe 36, and the second supply pipe 37, and the inside of each of those from clogging.

The pressurizing unit 33 is an air pump that pressurizes the inside of the hopper 32 with gas. In the present embodiment, as illustrated in FIG. 1, the pressurizing unit 33 is connected to the first hopper 32a via a first connecting pipe 38 and is connected to the second hopper 32b via a second connecting pipe 39.

The pressurizing unit 33 pressurizes the inside of the hopper 32 at, for example, all times. For this reason, when the exhaust valve 31c and the check valve 13b of the end plate 13 are closed, sealed spaces formed by the first cylinder 11, the second cylinder 12, space surrounded by the torpedo pistons 14a, 15a and the pressurizing pistons 14d, 15d, and the case 16e of the first drive unit 16 are maintained at a high pressure with respect to the outside of the case 16e.

The second control unit 34 controls the exhaust valve 31c such that the exhaust valve 31c discharges gas from the first space S1 of the first cylinder 11 or from the first space S3 of the second cylinder 12 at a desired timing described below.

As illustrated in FIG. 1, the table 4 is arranged on the minus side of the Z-axis with respect to the injection molding machine 2 and is a molding table used for laminating the molten resin injected from the injection port 18a of the injection molding machine 2 to form a workpiece. The molten resin injected (discharged) from the injection port 18a is referred to as a resin bead (the molten resin discharged from the injection port 18a and solidified like a thread). Here, the table 4 is configured to be, for example, heatable. The moving device 5 causes the injection molding machine 2 and the table 4 to move to mold a workpiece. As illustrated in FIGS. 1 and 2, the moving device 5 includes, for example, a gantry device 51, an elevating device 52, and a third control unit 53.

The gantry device 51 causes the injection molding machine 2 to move in the X-axis direction and the Y-axis direction. As the gantry device 51, a general gantry device can be used, and, for example, a slide rail extending in the X-axis direction and a slide rail extending in the Y-axis direction can be combined and composed.

The elevating device 52 causes the table 4 to move up and down in the Z-axis direction. As the elevating device 52, for example, a general elevating device can be used and composed of a ball screw. The third control unit 53 controls the gantry device 51 and the elevating device 52 such that the molten resin injected from the injection molding machine 2 is laminated to form a desired workpiece.

As illustrated in FIGS. 1 to 3, the heating device 6 includes a first heating unit 61, a second heating unit 62, a temperature detection unit 63, and a fourth control unit 64. The first heating unit 61 keeps the plasticized molten resin warm.

The first heating unit 61 can be composed of, for example, a seat heater that surrounds portions on the minus side of the Z-axis of the first cylinder 11 and the second cylinder 12. However, the first heating unit 61 may be any heating unit as long as it can keep the plasticized molten resin warm, and a configuration and an arrangement thereof are not limited.

The second heating unit 62 heats the molten resin to a desired temperature. As illustrated in FIGS. 3 and 6, the second heating unit 62 includes, for example, seat heaters 62a and a heat transfer member 62b. When viewed from the Z-axis direction, the seat heaters 62a are arranged at substantially equal intervals around the injection port 18a of the injection portion 18. The heat transfer member 62b has a disk shape in which a through hole is formed substantially at the center of the heat transfer member 62b, and is composed of a ceramic plate.

The heat transfer member 62b is arranged between the first plate 18e and the second plate 18f. At this time, the seat heater 62a is arranged between the heat transfer member 62b and the first plate 18e, or between the heat transfer member 62b and the second plate 18f. As such, it is possible to appropriately transfer heat of the seat heater 62a to the first plate 18e or the second plate 18f.

Here, when the first plate 18e and the second plate 18f are composed of the above-described ceramic plates, a heat capacity of the ceramic plate is smaller than that of metal. Thus, it is possible to efficiently transfer heat of the second heating unit 62 to the molten resin. Further, when the second heating unit 62 is damaged, it is possible to easily replace it by loosening the retailing nut 18d.

The temperature detection unit 63 detects the temperature of the molten resin. The temperature detection unit 63 is provided in, for example, the injection portion 18. At this time, the temperature detection unit 63 is provided on the first plate 18e or the second plate 18f which is composed of the ceramic plate. As such, it is possible to highly accurately detect the temperature of the molten resin.

Based on the detection result of the temperature detection unit 63, the fourth control unit 64 controls the first heating unit 61 and the second heating unit 62 such that the temperature of the molten resin is within a range set in advance. When the first cylinder 11 and the second cylinder 12 are configured to keep the molten resin R warm, the heating device 6 may be omitted.

As illustrated in FIG. 2, the control device 7 includes the first control unit 19, the second control unit 34, the third control unit 53, and the fourth control unit 64, and executes control of them to form a workpiece.

Next, in the injection molding apparatus 1 according to the present disclosure, description will be made on an appropriate condition for restricting inflow of gas into the second space S2 of the first cylinder 11 or a second space S4 of the second cylinder 12 when the resin raw material M supplied to the first space S1 of the first cylinder 11 or the first space S3 of the second cylinder 12 is plasticized and the molten resin is caused to flow into the second space S2 of the first cylinder 11 or the second space S4 of the second cylinder 12 on the minus side of the Z-axis with respect to the second piston unit 15.

First, a size of an area surrounded by an outer circumferential edge in an XY cross-section of the pressurizing piston 14d of the first piston unit 14 is equal to or greater than a size of an area surrounded by an outer circumferential edge in an XY cross-section of the rod 16d. Similarly, a size of an area surrounded by an outer circumferential edge in an XY cross-section of the pressurizing piston 15d of the second piston unit 15 is equal to or greater than a size of an area surrounded by an outer circumferential edge in the XY cross-section of the rod 17d.

Then, a volume of the second space S2 in a state where the torpedo piston 14a is arranged on the most plus side of the Z-axis and the pressurizing piston 14d is arranged in the second space S2 of the first cylinder 11 so as to inject the molten resin is equal to or smaller than a volume of the first space S1 in a state where the torpedo piston 14a is arranged on the most minus side of the Z-axis and the rod 16d is arranged in the first space S1 of the first cylinder 11 so as to plasticize the resin raw material M.

Similarly, a volume of the second space S4 in a state where the torpedo piston 15a is arranged on the most plus side of the Z-axis and the pressurizing piston 15d is arranged in the second space S4 of the second cylinder 12 so as to inject the molten resin is equal to or smaller than a volume of the first space S3 in a state where the torpedo piston 15a is arranged on the most minus side of the Z-axis and the rod 17d is arranged in the first space S3 of the second cylinder 12 so as to plasticize the resin raw material M.

The following equations 1 to 3 is further satisfied:

$$(\pi \times Dc^2 - Dr^2) \times Lr \times \gamma / 4 \geq (\pi \times (Dc^2 - Dp^2) \times Lr) / 4 \quad \text{(Equation 1)}$$

$$\pi \times Lr \times \{(Dc^2 - Dr^2) \times \gamma - (Dc^2 - Dp^2)\}/4 \leq \pi \times Dp^2 \times Lp/4 \quad \text{(Equation 2)}$$

$$(Dc^2 - Dp^2)/(Dc^2 - Dr^2) \leq \gamma \leq Dp^2/(Dc^2 - Dr^2) \times Lp/Lr + (Dc^2 - Dp^2)/(Dc^2 - Dr^2) \quad \text{(Equation 3)}$$

Here, Dc is an inner diameter of the first cylinder 11 and the second cylinder 12, Dp is an outer diameter of the pressurizing pistons 14d, 15d, Dr is an outer diameter of the rods 16d, 17d, Lp is the maximum stroke amount (the maximum movement amount) of the pressurizing pistons 14d, 15d, Lr is the maximum stroke amount (the maximum movement amount) of the torpedo pistons 14a, 15a, and γ is a filling rate of the resin raw material M.

As expressed in the equation 1, a volume of the resin raw material M supplied to the first space S1 of the first cylinder 11 or the first space S3 of the second cylinder 12 is equal to or greater than an increase amount of the volume of the second space S2 of the first cylinder 11 or the second space S4 of the second cylinder 12 when the resin raw material M is plasticized.

Here, the volume of the resin raw material M is substantially equal to a volume of the molten resin. For this reason, it can be said that the volume of the molten resin flowing into the second space S2 of the first cylinder 11 or the second space S4 of the second cylinder 12 is equal to or greater than the increase amount of the volume of the second space S2 of the first cylinder 11 or the second space S4 of the second cylinder 12 when the molten resin flows thereinto.

As expressed in the equation 2, an amount by which the volume of the second space S2 of the first cylinder 11 or the second space S4 of the second cylinder 12 can be increased by moving the pressurizing pistons 14d, 15d which are arranged on the most minus side of the Z-axis to the plus side of the Z-axis, should be equal to or greater than a difference obtained by subtracting the increase amount of the volume of the second space S2 of the first cylinder 11 or the second space S4 of the second cylinder 12 from the volume of the molten resin.

As such, according to the equation 1, by moving the pressurizing pistons 14d, 15d to the plus side of the Z-axis, it is possible to absorb the amount of the molten resin obtained by subtracting the increase amount of the volume of the second space S2 of the first cylinder 11 or the second space S4 of the second cylinder 12 from the volume of the molten resin.

In the equation 3, solutions of the equation 1 and the equation 2 with respect to the filling rate of the resin raw material M are expressed. As such, even when the type and the like of the resin raw material M are different, by satisfying the equation 3, it is possible to restrict inflow of gas into the second space S2 of the first cylinder 11 or the second space S4 of the second cylinder 12.

Next, a flow of molding a workpiece using the injection molding apparatus 1 according to the present embodiment will be described. FIGS. 9 to 13 are diagrams illustrating an operation of the injection molding apparatus 1 according to the present embodiment. In FIGS. 9 to 13, the upper rows illustrate the operation of the injection molding machine 2 and the lower rows illustrate timings of the plasticization of the resin raw material M, the injection of the molten resin R, and the like in the first cylinder 11 and the second cylinder 12.

Figure 9:
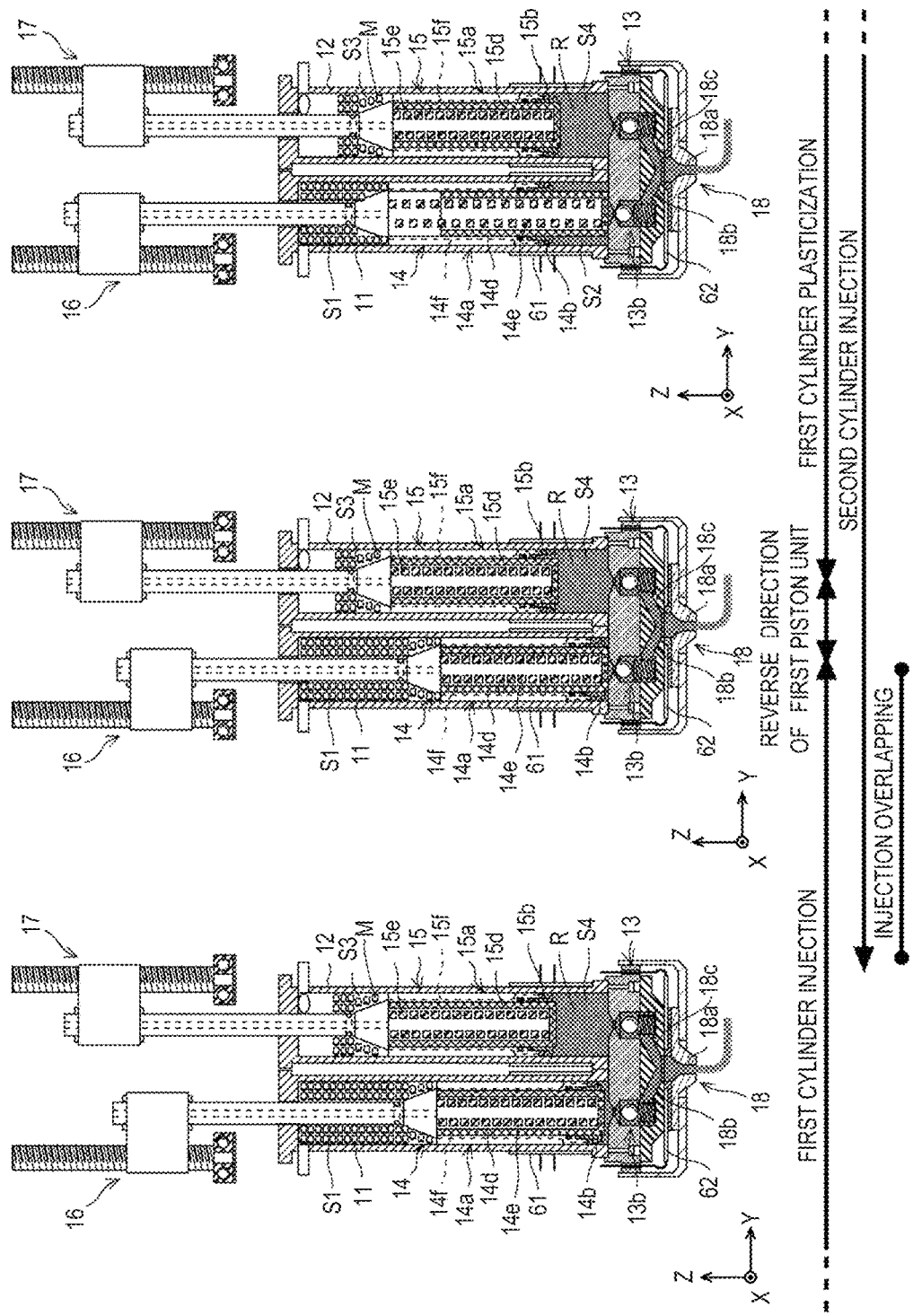
FIG. 9 is a diagram illustrating an operation of the injection molding apparatus according to the first embodiment.

Here, on the left side of FIG. 9, in a state where the supply of the resin raw material M from the first hopper 32a of the supply device 3 to the first space S1 of the first cylinder 11 is completed, the first piston unit 14 moves to the minus side of the Z-axis and the molten resin R that has flowed into the second space S2 of the first cylinder 11 is injected.

On the other hand, the second piston unit 15 moves to the minus side of the Z-axis and the injection of the molten resin R from the second space S4 of the second cylinder 12 is started. At this time, it is assumed that the pressurizing piston 15d of the second piston unit 15 is arranged on the most plus side of the Z-axis. Further, it is assumed that the exhaust valve 31c of the exhaust unit 31 is closed.

From such a state, the first control unit 19 controls the motor 16a such that the first piston unit 14 continues to move to the minus side of the Z-axis and the molten resin R continues to be injected, and controls the motor 17a such that the second piston unit 15 continues to move to the minus side of the Z-axis and the molten resin R continues to be injected.

Figure 10:
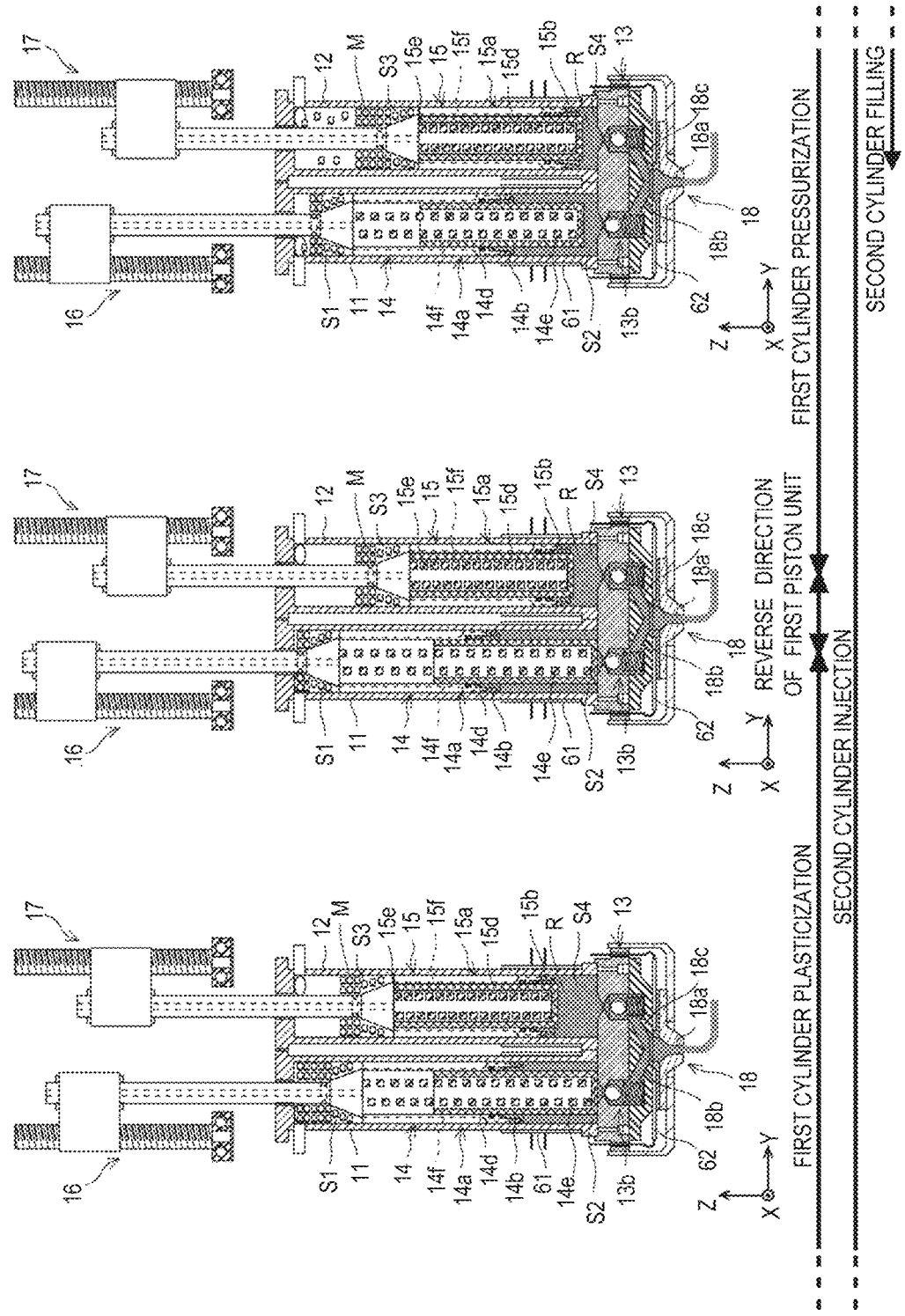
FIG. 10 is another diagram illustrating the operation of the injection molding apparatus according to the first embodiment.

Next, upon confirming, with reference to the detection result of the encoder 16f, that the first piston unit 14 has reached the most minus side of the Z-axis (a bottom dead point), the first control unit 19 controls the motor 16a such that the first piston unit 14 starts to move to the plus side of the Z-axis, as illustrated at the center of FIG. 9→ on the right side of FIG. 9→ on the left side of FIG. 10.

As such, during a period from the start of the injection of the molten resin R from the second cylinder 12 to the stop of the injection of the molten resin R from the first cylinder 11, the molten resin R is injected from the first cylinder 11 and the second cylinder 12.

For that reason, a period in which the molten resin R is injected from the second cylinder 12 can overlap with a period in which the molten resin R is injected from the first cylinder 11 by a first period set in advance. Therefore, it is possible to continuously inject the molten resin R from the first cylinder 11 and the second cylinder 12.

Here, the first period set in advance can be appropriately set according to movement speeds of the piston units 14, 15, respectively. Then, when the first control unit 19 controls the motors 16a, 17a and adjusts the movement speeds of the piston units 14, 15, respectively, such that an injection amount of the molten resin R injected from the injection portion 18 becomes a target injection amount, it is possible to highly accurately mold a desired workpiece.

When the movement of the first piston unit 14 to the plus side of the Z-axis is started, the resin raw material M is compressed in the first piston unit 14, the closed portion 11*a* of the first cylinder 11, and the side wall portion 11*b* of the first cylinder 11, is plasticized while passing through the groove portion 14*f* of the torpedo piston 14*a* of the first piston unit 14 to become the molten resin R, and flows into the second space S2 of the first cylinder 11.

At this time, the supply hole 11*d* is formed in the side wall portion 11*b* of the first cylinder 11, and thus the resin raw material M is unlikely to leak from the supply hole 11*d*. Moreover, a force on the plus side of the Z-axis, which acts when the resin raw material M is plasticized in the first piston unit 14, can be received by the closed portion 11*a* of the first cylinder 11.

Further, when the surface on the plus side of the Z-axis of the torpedo piston 14*a* of the first piston unit 14 is formed on an inclined surface that inclines toward the minus side of the Z-axis as it goes toward the peripheral edge portion from the center of the torpedo piston 14*a*, it is possible to suitably guide the resin raw material M to the groove portion 14*f* of the torpedo piston 14*a* of the first piston unit 14 when the first piston unit 14 moves to the plus side of the Z-axis.

Then, when the first piston unit 14 moves to the plus side of the Z-axis, the check ring 14*b* of the first piston unit 14 is pushed to the minus side of the Z-axis, and thus it is possible to cause the molten resin R to suitably flow into the second space S2 of the first cylinder 11 from the through hole of the check ring 14*b* through a gap between the torpedo piston 14*a* and the check ring 14*b*.

In this manner, when the first piston unit 14 moves to the plus side of the Z-axis, the pressurizing piston 14*d* protrudes to the minus side of the Z-axis with respect to the torpedo piston 14*a* due to the biasing force of the biasing tool 14*e* such that the state where the end on the minus side of the Z-axis of the pressurizing piston 14*d* is in contact with the end plate 13 is maintained.

Then, in the present embodiment, the size of the area surrounded by the outer circumferential edge in the XY cross-section of the pressurizing piston 14*d* of the first piston unit 14 is equal to or greater than the size of the area surrounded by the outer circumferential edge in the XY cross-section of the rod 16*d*, and the volume of the second space S2 in the state where the torpedo piston 14*a* is arranged on the most plus side of the Z-axis and the pressurizing piston 14*d* is arranged in the second space S2 of the first cylinder 11 so as to inject the molten resin R is equal to or smaller than the volume of the first space S1 in the state where the torpedo piston 14*a* is arranged on the most minus side of the Z-axis and the rod 16*d* is arranged in the first space S1 of the first cylinder 11 so as to plasticize the resin raw material M.

For this reason, the pressurizing piston 14*d* is biased by the biasing tool 14*e* such that the increase amount of the volume of the second space S2 of the first cylinder 11 when the torpedo piston 14*a* moves to the plus side of the Z-axis is equal to or smaller than a decrease amount of the volume of the first space S1 of the first cylinder 11. Therefore, it is possible to restrict inflow of gas into the second space S2 of the first cylinder 11 when the molten resin R flows thereinto.

On the other hand, the first control unit 19 controls the motor 17*a* with reference to the detection result of the encoder 17*f* such that the second piston unit 15 continues to move to the minus side of the Z-axis. As such, the molten resin R is injected through the through hole 13*c* on the plus side of the Y-axis and the second branch path 18*c* and the injection port 18*a* of the injection portion 18 while pushing the check valve 13*b* on the plus side of the Y-axis of the end plate 13 to the minus side of the Z-axis. At this time, the check valve 13*b* on the plus side of the Y-axis blocks the molten resin R from flowing to the plus side of the Z-axis due to the pressure of the molten resin R injected from the second cylinder 12.

Then, when the second piston unit 15 moves to the minus side of the Z-axis, the check ring 15*b* of the second piston unit 15 is pushed to the plus side of the Z-axis, and the groove portion 15*f* of the torpedo piston 15*a* is closed by the check ring 15*b*. Therefore, it is possible to restrict a reverse flow of the molten resin R into the first space S3 of the second cylinder 12 through the groove portion 15*f* of the torpedo piston 15*a*.

Next, upon confirming, with reference to the encoder 16*f*, that the first piston unit 14 has reached the most plus side of the Z-axis, the first control unit 19 controls the motor 16*a* such that the first piston unit 14 starts to move to the minus side of the Z-axis, as illustrated at the center of FIG. 10. On the other hand, the first control unit 19 controls the motor 17*a* with reference to the encoder 17*f* such that the second piston unit 15 continues to move to the minus side of the Z-axis.

At this time, the pressurizing piston 14*d* of the first piston unit 14 is in a state of protruding from the torpedo piston 14*a* to the most minus side of the Z-axis, and as the first piston unit 14 moves to the minus side of the Z-axis, the pressure of the molten resin R in the second space S2 of the first cylinder 11 rises.

Figure 11:
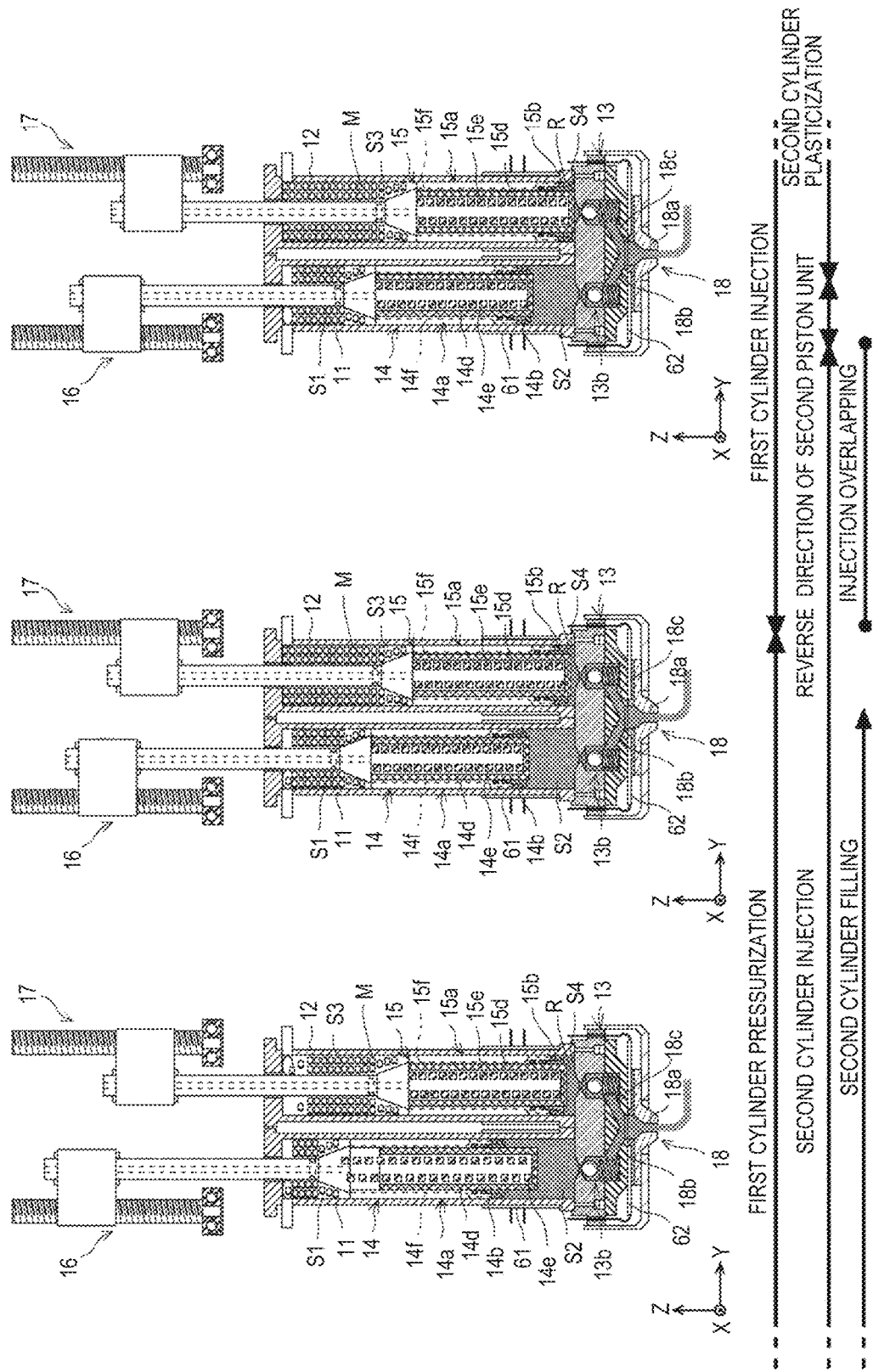
FIG. 11 is still another diagram illustrating the operation of the injection molding apparatus according to the first embodiment.

Then, as the molten resin R in the second space S2 of the first cylinder 11 invades into the invading portion 14*j* of the pressurizing piston 14*d*, the force due to the pressure of the molten resin R exceeds the biasing force of the biasing tool 14*e* and, as illustrated on the right side of FIG. 10→ on the left side of FIG. 11→ at the center of FIG. 11, the pressurizing piston 14*d* is pushed to the minus side of the Z-axis. At this time, the gas in the space surrounded by the torpedo piston 14*a* and the pressurizing piston 14*d* is exhausted from the exhaust passage 31*a* into the case 16*e* by an amount that causes the volume of the space to be reduced.

On the other hand, when the first control unit 19 confirms, with reference to the encoder 17*f*, that the second piston unit 15 has reached a position in the Z-axis direction set in advance, the second control unit 34 controls the exhaust valve 31*c* of the exhaust unit 31 such that the exhaust valve 31*c* opens.

As such, the gas in the first space S3 of the second cylinder 12 invades into the case 16*e* through the exhaust passage 31*a* of the rod 17*d* and is discharged through the exhaust hole 31*b* and the exhaust valve 31*c*. As a result, a flow of gas flowing from the second hopper 32*b* into the first space S3 of the second cylinder 12 is generated and, as illustrated on the right side of FIG. 10→ on the left side of FIG. 11→ at the center of FIG. 11, the resin raw material M is pushed from the second hopper 32*b* by the gas and supplied to the first space S3 of the second cylinder 12 through the supply hole 12*d* of the second cylinder 12.

At this time, since the supply hole 12*d* is formed in the side wall portion 12*b* of the second cylinder 12, the resin raw material M falls to the minus side of the Z-axis while swirling with the gas. For this reason, it is possible to supply the resin raw material M to the first space S3 of the second cylinder 12 in a substantially uniform manner.

Next, when the pressurizing piston 14*d* reaches the most plus side of the Z-axis (for example, the end on the plus side of the Z-axis of the pressurizing piston 14*d* comes into contact with the end on the plus side of the Z-axis of the torpedo piston 14a) and the pressure that pushes the molten resin R to the minus side of the Z-axis at the end on the minus side of the Z-axis of the first piston unit 14 reaches a pressure set in advance, the check valve 13b on the minus side of the Y-axis of the end plate 13 is opened.

As such, the molten resin R is injected through the through hole 13c on the minus side of the Y-axis and the first branch path 18b and the injection port 18a of the injection portion 18 while pushing the check valve 13b on the minus side of the Y-axis of the end plate 13 to the minus side of the Z-axis.

At this time, when the first piston unit 14 moves to the minus side of the Z-axis, the check ring 14b of the first piston unit 14 is pushed to the plus side of the Z-axis, and the groove portion 14f of the torpedo piston 14a is closed by the check ring 14b. Therefore, it is possible to restrict a reverse flow of the molten resin R into the first space S1 of the first cylinder 11 through the groove portion 14f of the torpedo piston 14a.

On the other hand, when the first control unit 19 confirms, with reference to the encoder 17f, that the second piston unit 15 has reached a vicinity of the most minus side of the Z-axis, the second control unit 34 executes the control of the exhaust valve 31c of the exhaust unit 31 so as to close the exhaust valve 31c. At this time, the first space S3 of the second cylinder 12 is in a state of being filled with the resin raw material M.

In other words, it is possible to automatically supply the resin raw material M to the first space S3 of the second cylinder 12 only by opening the exhaust valve 31c of the exhaust unit 31. At this time, the resin raw material M is supplied to the first space S3 of the second cylinder 12 between the time when the second piston unit 15 reaches the position in the Z-axis direction set in advance and the time when it reaches the vicinity of the most minus side of the Z-axis. Therefore, it is possible to quantitatively supply the resin raw material M to the second cylinder 12.

Thus, a period in which the resin raw material M is supplied to the first space S3 of the second cylinder 12 can overlap with a period in which the molten resin R is injected from the second cylinder 12 by a second period set in advance.

For that reason, it is possible to efficiently repeat the injection of the molten resin R from the second cylinder 12 and the supply of the resin raw material M to the second cylinder 12. Here, the second period set in advance can be appropriately set according to the movement speed of the second piston unit 15, the timing of opening the exhaust valve 31c of the exhaust unit 31, or the like.

Figure 12:
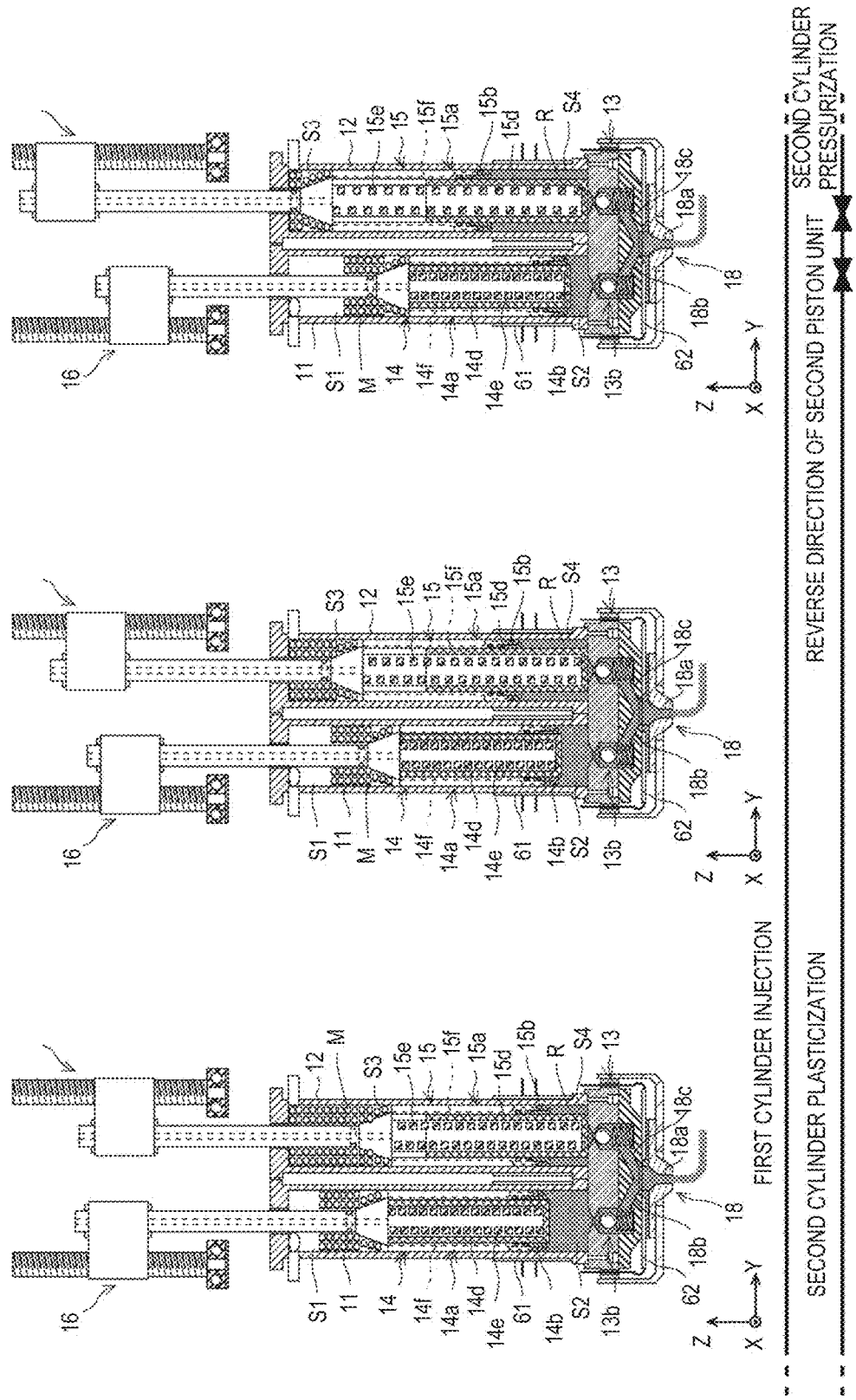
FIG. 12 is yet another diagram illustrating the operation of the injection molding apparatus according to the first embodiment.

Next, upon confirming, with reference to the detection result of the encoder 17f, that the second piston unit 15 has reached the most minus side of the Z-axis (the bottom dead point), the first control unit 19 controls the motor 17a such that the second piston unit 15 starts to move to the plus side of the Z-axis, as illustrated on the right side of FIG. 11→ on the left side of FIG. 12→ at the center of FIG. 12. At this time, the check valve 13b on the minus side of the Y-axis blocks the molten resin R from flowing to the plus side of the Z-axis due to the pressure of the molten resin R injected from the first cylinder 11.

As such, the resin raw material M is compressed in the second piston unit 15, the closed portion 12a of the second cylinder 12, and the side wall portion 12b of the second cylinder 12, is plasticized while passing through the groove portion 15f of the torpedo piston 15a of the second piston unit 15 to become the molten resin R, and flows into the second space S4 of the second cylinder 12.

At this time, the supply hole 12d is formed in the side wall portion 12b of the second cylinder 12, and thus the resin raw material M is unlikely to leak from the supply hole 12d. Moreover, the force on the plus side of the Z-axis, which acts when the resin raw material M is plasticized in the second piston unit 15, can be received by the closed portion 12a of the second cylinder 12.

Further, when a surface on the plus side of the Z-axis of the torpedo piston 15a of the second piston unit 15 is formed on an inclined surface that inclines toward the minus side of the Z-axis as it goes toward the peripheral edge portion from the center of the torpedo piston 15a, it is possible to suitably guide the resin raw material M to the groove portion 15f of the torpedo piston 15a of the second piston unit 15 when the second piston unit 15 moves to the plus side of the Z-axis.

Then, when the second piston unit 15 moves to the plus side of the Z-axis, the check ring 15b of the second piston unit 15 is pushed to the minus side of the Z-axis, and thus it is possible to cause the molten resin R to suitably flow into the second space S4 of the second cylinder 12 from the through hole of the check ring 15b through a gap between the torpedo piston 15a and the check ring 15b.

In this manner, when the second piston unit 15 moves to the plus side of the Z-axis, the pressurizing piston 15d protrudes to the minus side of the Z-axis with respect to the torpedo piston 15a due to the biasing force of the biasing tool 15e such that the state where the end on the minus side of the Z-axis of the pressurizing piston 15d is in contact with the end plate 13 is maintained.

Then, in the present embodiment, the size of the area surrounded by the outer circumferential edge in the XY cross-section of the pressurizing piston 15d is equal to or greater than the size of the area surrounded by the outer circumferential edge in the XY cross-section of the rod 17d, and the volume of the second space S4 in the state where the torpedo piston 15a is arranged on the most plus side of the Z-axis and the pressurizing piston 15d is arranged in the second space S4 of the second cylinder 12 so as to inject the molten resin R is equal to or smaller than the volume of the first space S3 in the state where the torpedo piston 15a is arranged on the most minus side of the Z-axis and the rod 17d is arranged in the first space S3 of the second cylinder 12 so as to plasticize the resin raw material M.

For this reason, the pressurizing piston 15d is biased by the biasing tool 15e such that the increase amount of the volume of the second space S4 of the second cylinder 12 when the torpedo piston 15a moves to the plus side of the Z-axis is equal to or smaller than a decrease amount of the volume of the first space S3 of the second cylinder 12. Therefore, it is possible to restrict inflow of gas when the molten resin R flows into the second space S4 of the second cylinder 12.

On the other hand, the first control unit 19 controls the motor 16a with reference to the detection result of the encoder 16f such that the first piston unit 14 continues to move to the minus side of the Z-axis. As such, during a period from the start of the injection of the molten resin R from the first cylinder 11 to the stop of the injection of the molten resin R from the second cylinder 12, the molten resin R is injected from the first cylinder 11 and the second cylinder 12.

For that reason, the period in which the molten resin R is injected from the first cylinder 11 can overlap with the period in which the molten resin R is injected from the second cylinder 12 by the first period set in advance. Therefore, it is possible to continuously inject the molten resin R from the first cylinder 11 and the second cylinder 12.

Then, when the first control unit 19 controls the motors 16a, 17a and adjusts the movement speeds of the piston units 14, 15, respectively, such that the injection amount of the molten resin R injected from the injection portion 18 becomes the target injection amount, it is possible to highly accurately mold a desired workpiece.

Next, upon confirming, with reference to the encoder 17f, that the second piston unit 15 has reached the most plus side of the Z-axis, the first control unit 19 controls the motor 17a such that the second piston unit 15 starts to move to the minus side of the Z-axis, as illustrated on the right side of FIG. 12. On the other hand, the first control unit 19 controls the motor 16a with reference to the encoder 16f such that the first piston unit 14 continues to move to the minus side of the Z-axis.

At this time, the pressurizing piston 15d of the second piston unit 15 is in a state of protruding from the torpedo piston 15a to the most minus side of the Z-axis, and as the second piston unit 15 moves to the minus side of the Z-axis, the pressure of the molten resin R in the second space S4 of the second cylinder 12 rises.

Figure 13:
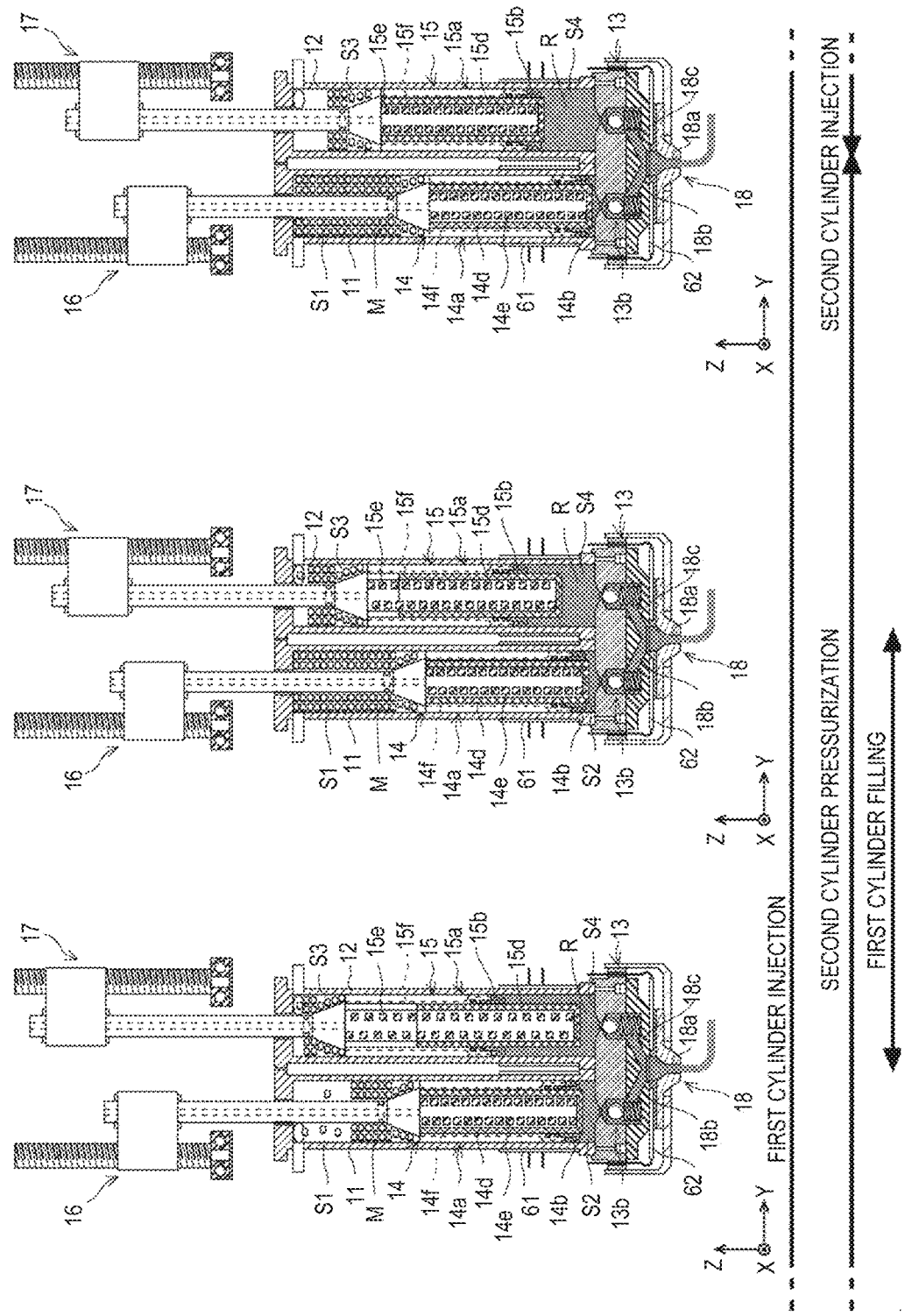
FIG. 13 is yet still another diagram illustrating the operation of the injection molding apparatus according to the first embodiment.

Then, as the molten resin R in the second space S4 of the second cylinder 12 invades into the invading portion 15j of the pressurizing piston 15d, the force due to the pressure of the molten resin R exceeds the biasing force of the biasing tool 15e and, as illustrated on the left side of FIG. 13, the pressurizing piston 15d is pushed to the minus side of the Z-axis. At this time, the gas in space surrounded by the torpedo piston 15a and the pressurizing piston 15d is exhausted from the exhaust passage 31a into the case 16e by an amount that causes the volume of the space to be reduced.

On the other hand, when the first control unit 19 confirms, with reference to the encoder 16f, that the first piston unit 14 has reached the position in the Z-axis direction set in advance, the second control unit 34 controls the exhaust valve 31c of the exhaust unit 31 such that the exhaust valve 31c opens.

As such, the gas in the first space S1 of the first cylinder 11 invades into the case 16e through the exhaust passage 31a of the rod 16d and is discharged through the exhaust hole 31b and the exhaust valve 31c. As a result, a flow of gas flowing from the first hopper 32a into the first space S1 of the first cylinder 11 is generated, and the resin raw material M is pushed from the first hopper 32a by the gas and supplied to the first space S1 of the first cylinder 11 through the supply hole 11d of the first cylinder 11.

At this time, since the supply hole 11d is formed in the side wall portion 11b of the first cylinder 11, the resin raw material M falls to the minus side of the Z-axis while swirling with the gas. For this reason, it is possible to supply the resin raw material M to the first space S1 of the first cylinder 11 in a substantially uniform manner.

Next, as illustrated at the center of FIG. 13, when the first control unit 19 confirms, with reference to the encoder 16f, that the first piston unit 14 has reached the vicinity of the most minus side of the Z-axis, the second control unit 34 controls the exhaust valve 31c of the exhaust unit 31 such that the exhaust valve 31c closes. At this time, the first space S1 of the first cylinder 11 is in a state of being filled with the resin raw material M.

In other words, it is possible to automatically supply the resin raw material M to the first space S1 of the first cylinder 11 only by opening the exhaust valve 31c of the exhaust unit 31. At this time, the resin raw material M is supplied to the first space S1 of the first cylinder 11 between the time when the first piston unit 14 reaches the position in the Z-axis direction set in advance and the time when it reaches the vicinity of the most minus side of the Z-axis. Therefore, it is possible to quantitatively supply the resin raw material M to the first cylinder 11.

Thus, a period in which the resin raw material M is supplied to the first space S1 of the first cylinder 11 can overlap with the period in which the molten resin R is injected from the first cylinder 11 by the second period set in advance.

For that reason, it is possible to efficiently repeat the injection of the molten resin R from the first cylinder 11 and the supply of the resin raw material M to the first cylinder 11. Here, the second period set in advance can be appropriately set according to the movement speed of the first piston unit 14, the timing of opening the exhaust valve 31c of the exhaust unit 31, or the like.

Next, the first control unit 19 controls the motor 16a such that the first piston unit 14 continues to move to the minus side of the Z-axis, and controls the motor 17a such that the second piston unit 15 continues to move to the minus side of the Z-axis.

Next, as illustrated on the right side of FIG. 13, moving to the state of the left side of FIG. 9, when the pressurizing piston 15d reaches the most plus side of the Z-axis (for example, the end on the plus side of the Z-axis of the pressurizing piston 15d comes into contact with the end on the plus side of the Z-axis of the torpedo piston 15a) and the pressure that pushes the molten resin R to the minus side of the Z-axis at the end on the minus side of the Z-axis of the second piston unit 15 reaches a pressure set in advance, the check valve 13b on the plus side of the Y-axis of the end plate 13 is opened.

As such, the molten resin R is injected through the through hole 13c on the plus side of the Y-axis and the second branch path 18c and the injection port 18a of the injection portion 18 while pushing the check valve 13b on the plus side of the Y-axis of the end plate 13 to the minus side of the Z-axis.

In this manner, when the first control unit 19 controls the motors 16a, 17a such that the molten resin R is continuously injected from the first cylinder 11 and the second cylinder 12, and the third control unit 53 controls the gantry device 51 and the elevating device 52 such that a desired workpiece is laminated and modeled on the surface on the plus side of the Z-axis of the table 4 by the injected molten resin R, it is possible to mold a workpiece.

At this time, based on the detection result of the temperature detection unit 63, the fourth control unit 64 controls the first heating unit 61 and the second heating unit 62 such that the temperature of the injected molten resin R is within a range set in advance. As such, it is possible to inject the molten resin R in a stable state.

The injection molding apparatus 1, the injection molding machine 2, and the injection molding method of the present embodiment include the pressurizing pistons 14d, 15d slidable in the Z-axis direction, and the biasing tools 14e, 15e that bias the pressurizing pistons 14d, 15d on the minus side of the Z-axis with respect to the torpedo pistons 14a, 15a such that the protrusion amounts of the first and the second cylinders 11, 12 to the second spaces S2, S4 with respect to the torpedo pistons 14a, 15a are changed.

For this reason, it is possible to reduce the volumes of the second spaces S2, S4 when the molten resin R flows into the second spaces S2, S4 of the first and the second cylinders 11, 12, and to restrict inflow of gas into the second spaces S2, S4 when the molten resin R flows thereinto. Therefore, the injection molding apparatus 1, the injection molding machine 2, and the injection molding method of the present embodiment can restrict gas from being mixed with the molten resin R when the molten resin R is injected, and contribute to improvement of the quality of the workpiece.

Specifically, in the injection molding apparatus 1, the injection molding machine 2, and the injection molding method of the present embodiment, the biasing tools 14e, 15e that bias the pressurizing pistons 14d, 15d such that the increase amounts of the volumes of the second spaces S2, S4 of the first and the second cylinders 11, 12 when the torpedo pistons 14a, 15a move to the plus side of the Z-axis are equal to or smaller than the decrease amounts of the volumes of the first spaces S1, S3 of the first and the second cylinders 11, 12. Therefore, it is possible to restrict inflow of gas into the second spaces S2, S4 of the first and the second cylinders 11, 12 when the molten resin R flows thereinto.

Moreover, in the injection molding apparatus 1, the injection molding machine 2, and the injection molding method of the present embodiment, a part of the period in which the molten resin R is injected from the first cylinder 11 overlaps with a part of the period in which the molten resin R is injected from the second cylinder 12. As such, it is possible to continuously inject the molten resin R from the first cylinder 11 and the second cylinder 12.

Further, in the injection molding apparatus 1, the injection molding machine 2, and the injection molding method of the present embodiment, it is possible to automatically supply the resin raw material M to the first and the second cylinders 11, 12 only by opening the exhaust valve 31c of the exhaust unit 31. In other words, the supply device 3 of the present embodiment can function as an automatic supply device for the resin raw material M. For this reason, it is possible to supply the resin raw material M with a simple configuration.

Further, since the resin raw material M is supplied to the first cylinder 11 or the second cylinder 12 from the time when the first piston unit 14 or the second piston unit 15 reaches the position in the Z-axis direction set in advance to the time when it reaches the vicinity of the most minus side of the Z-axis, it is possible to quantitatively supply the resin raw material M to the first and the second cylinders 11, 12. For this reason, it is possible to omit a measuring device for the resin raw material M.

The position in the Z-axis direction set in advance is set such that the first space S1 of the first cylinder 11 or the first space S3 of the second cylinder 12 is filled with the resin raw material M by the time when the first piston unit 14 or the second piston unit 15 reaches the vicinity of the most minus side of the Z-axis.

Here, since the end on the minus side of the Z-axis of the first cylinder 11 is open, it is possible to insert the first piston unit 14 or the rod 16d of the first drive unit 16 from the opening on the minus side of the Z-axis of the first cylinder 11. Similarly, since the end on the minus side of the Z-axis of the second cylinder 12 is open, it is possible to insert the second piston unit 15 or the rod 17d of the second drive unit 17 from the opening on the minus side of the Z-axis of the second cylinder 12. For this reason, it is possible to omit a plunger as provided in an injection molding apparatus of JP 5-016195 A.

As illustrated in FIG. 3, the injection molding machine 2 includes a cooling unit 8 between the case 16e of the first drive unit 16 and the first and the second cylinders 11, 12. The cooling unit 8 may have, for example, a ring shape as a basic form, and the through hole 8a through which the rod 16d or the rod 17d passes is formed so as to penetrate the cooling unit 8 in the Z-axis direction. Thus, a cooling passage 8b through which a cooling medium flows is formed in the cooling unit 8 so as to surround the through hole 8a.

With such a configuration, in the case where the workpiece is molded by the injection molding apparatus 1, when the cooling medium flows through the cooling passage 8b of the cooling unit 8, the heat from the first and the second cylinders 11, 12 is unlikely to be transferred to the bearing 16g of the first drive unit 16 or the bearing 17g of the second drive unit 17. For this reason, it is possible to restrict a temperature change of the bearings 16g, 17g and restrict an operation defect of the bearings 16g, 17g. As a result, it is possible to highly accurately mold a workpiece.

Second Embodiment

Next, a configuration of an injection molding machine 2A of a second embodiment will be described.

Figure 14:
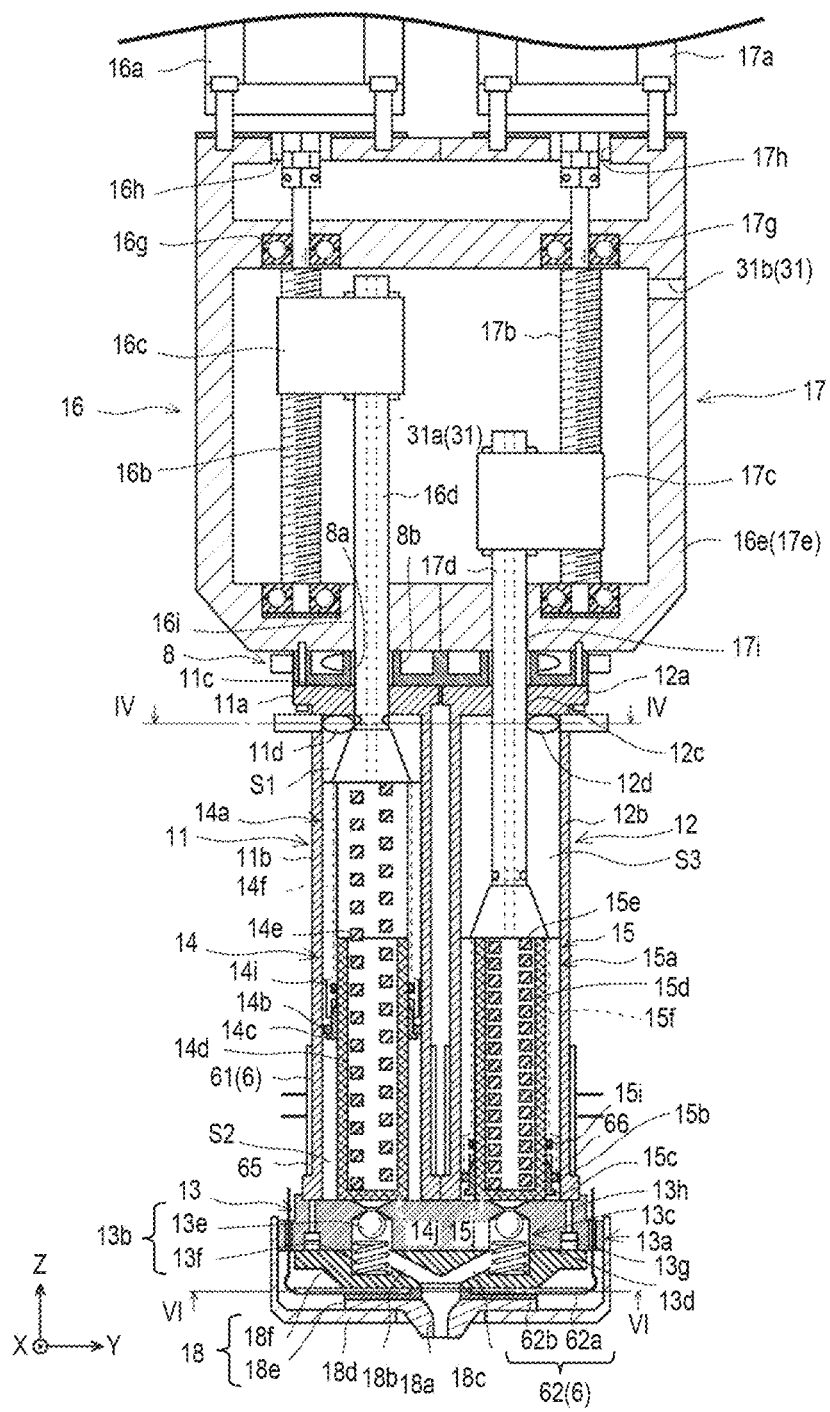
FIG. 14 is a configuration diagram of an injection molding apparatus according to a second embodiment.

FIG. 14 is a configuration diagram of the injection molding machine 2A of the second embodiment.

The configuration of the injection molding machine 2A of the second embodiment is the same as that of the injection molding machine 2 of the first embodiment except for the following points.

As illustrated in FIG. 14, a first pressure detection unit 65 and a second pressure detection unit 66 are added to the injection molding machine 2A of the second embodiment. The first pressure detection unit 65 is a pressure detection sensor that detects a pressure applied to the molten resin accommodated (stored) in the first cylinder 11, and examples thereof include a strain gauge. The strain gauge detects a pressure from the strain on an outer wall of the first cylinder 11 due to the pressure applied to the molten resin accommodated (stored) in the first cylinder 11. The first pressure detection unit 65 may be provided (for example, attached) on, for example, a portion, corresponding to a part in which the molten resin is accommodated, of the outer circumferential surface of the first cylinder 11. The second pressure detection unit 66 is a pressure detection sensor that detects a pressure applied to the molten resin accommodated (stored) in the second cylinder 12, and examples thereof include a strain gauge. The strain gauge detects a pressure from the strain on an outer wall of the second cylinder 12 due to the pressure applied to the molten resin accommodated (stored) in the second cylinder 12. The second pressure detection unit 66 may be provided (for example, attached) on, for example, a portion, corresponding to a part in which the molten resin is accommodated, of the outer circumferential surface of the second cylinder 12.

Further, in the second embodiment, potentiometers are used instead of the encoders 16f, 17f. Hereinafter, they will be referred to as potentiometers 16f, 17f. The potentiometer 16f is a position detection tool of the motor 16a (a servo motor). A position of the first torpedo 14 can be detected by a position detection value of the potentiometer 16f. Similarly, the potentiometer 17f is a position detection tool of the motor 17a (a servo motor). A position of the second torpedo 15 can be detected by a position detection value of the potentiometer 17f. Further, a ceramic heater is used instead of the seat heater 62a. Hereinafter, it is referred to as a ceramic heater 62a.

Further, in the second embodiment, a thermocouple is used as the temperature detection unit 63 (a tool that detects the temperature of the molten resin accommodated in the first and the second cylinders 11, 12).

Next, a control device 7A of the second embodiment will be described.

Figure 15:
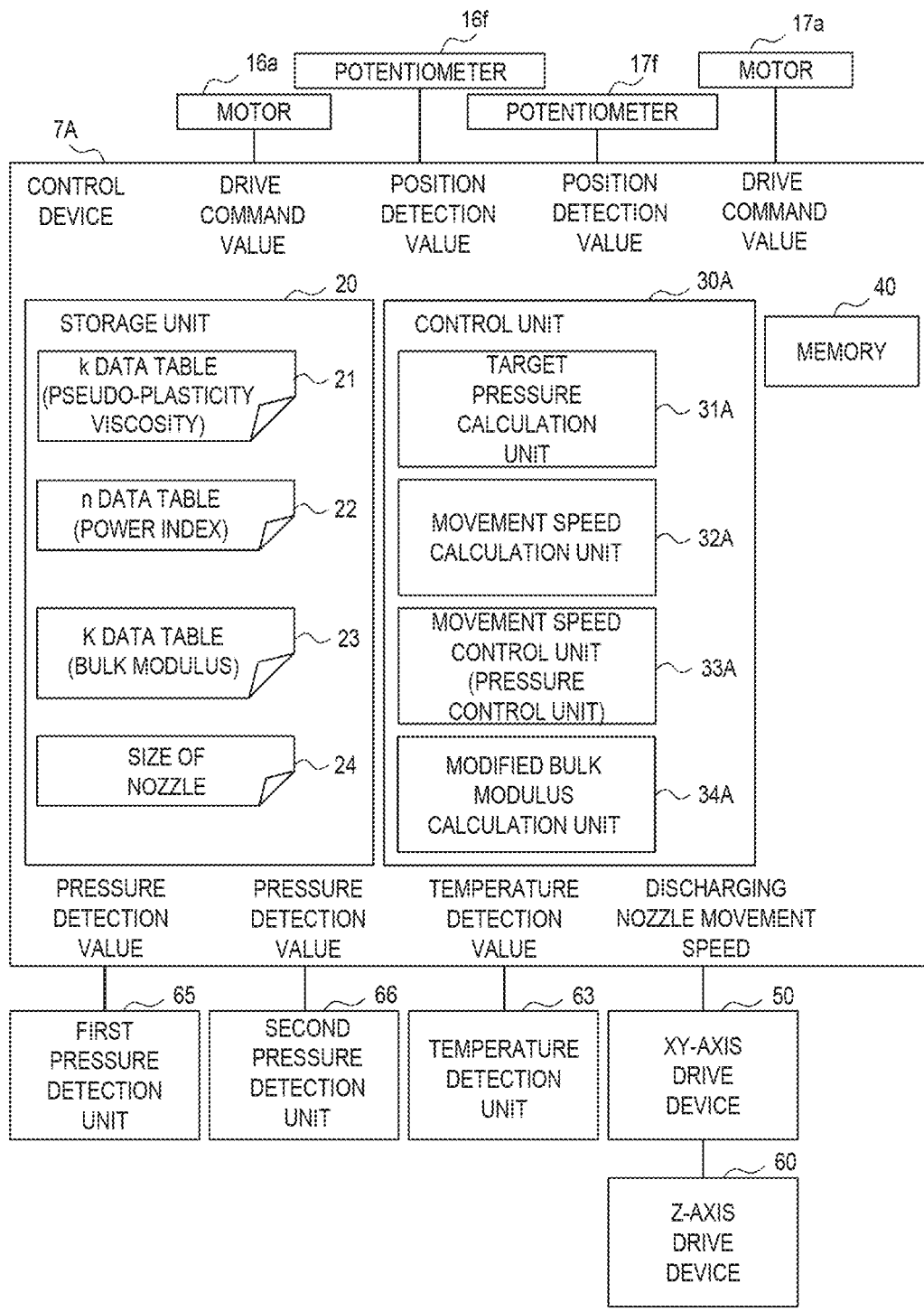
FIG. 15 is a configuration diagram of a control device according to the second embodiment.

FIG. 15 is a configuration diagram of the control device 7A of the second embodiment.

As illustrated in FIG. 15, the control device 7A includes a storage unit 20, a control unit 30A, and a memory 40.

The storage unit 20 is a non-volatile storage unit, such as a hard disk device or a ROM. The storage unit 20 stores a k data table 21, an n data table 22, and a K data table 23. Further, the storage unit 20 stores a discharging nozzle size 24 (for example, a nozzle diameter and a nozzle length). Further, the storage unit 20 stores a predetermined program (not shown) executed by the control unit 30A.

In the k data table 21, a pseudo-plastic viscosity k for each type and temperature of resins is stored in advance. The pseudo-plastic viscosity k will be described below. In the n data table 22, a power index n for each type of resins is stored in advance. The power index n will be described below. In the n data table 23, a bulk modulus K for each type of resins is stored in advance. The bulk modulus K will be described below.

The control unit 30A includes one or more processors (not shown). Examples of the processor include a central processing unit (CPU). The number of processors may be one or more. The processor executes a predetermined program read from the storage unit 20 using the memory 40 (for example, a RAM) to mainly function as a target pressure calculation unit 31A, a movement speed calculation unit 32A, a movement speed control unit 33A, and a modified bulk modulus calculation unit 34A. A part or all of these may be implemented in hardware.

The control device 7A is electrically connected to the motors 16a, 17a, the potentiometers 16f, 17f, the temperature detection unit 63, the first pressure detection unit 65, the second pressure detection unit 66, an XY-axis drive device 50, a Z-axis drive device 60, and the like.

The XY-axis drive device 50 drives the injection molding machine 2A (the discharging nozzle 18a) on the XY-axes by a mechanism (not shown). The Z-axis drive device 60 drives the base plate 4 on the Z-axis by a mechanism (not shown).

The injection molding apparatus 1 having the above configuration functions as a 3D printer (an example of an additive manufacturing apparatus of the present disclosure) that models a three-dimensional modeled object (a laminated modeled body) while forming resin beads on the base plate 4, which can be driven on the Z-axis, using the molten resin discharged (injected) from the injection molding machine 2A (the discharging nozzle 18a), which is driven on the XY-axes, and sequentially laminating them.

Next, an operation of the injection molding machine 2A of the second embodiment will be described. The following processing is implemented when the control unit 30A (a processor) executes a predetermined program read from the storage unit 20 using the memory 40 (for example, a RAM).

The base plate 4 is arranged directly under the resin discharging hole of the discharging nozzle 18a, and the discharging nozzle 18a is moved by the XY-axis drive device 50 along a modeling track which is a first layer of the laminated modeled body. At that time, the movement speed of the discharging nozzle 18a is input to the control device 7A, and a drive command value is output to the motors 16a, 17a according to the flowchart of FIG. 27.

Figure 21:
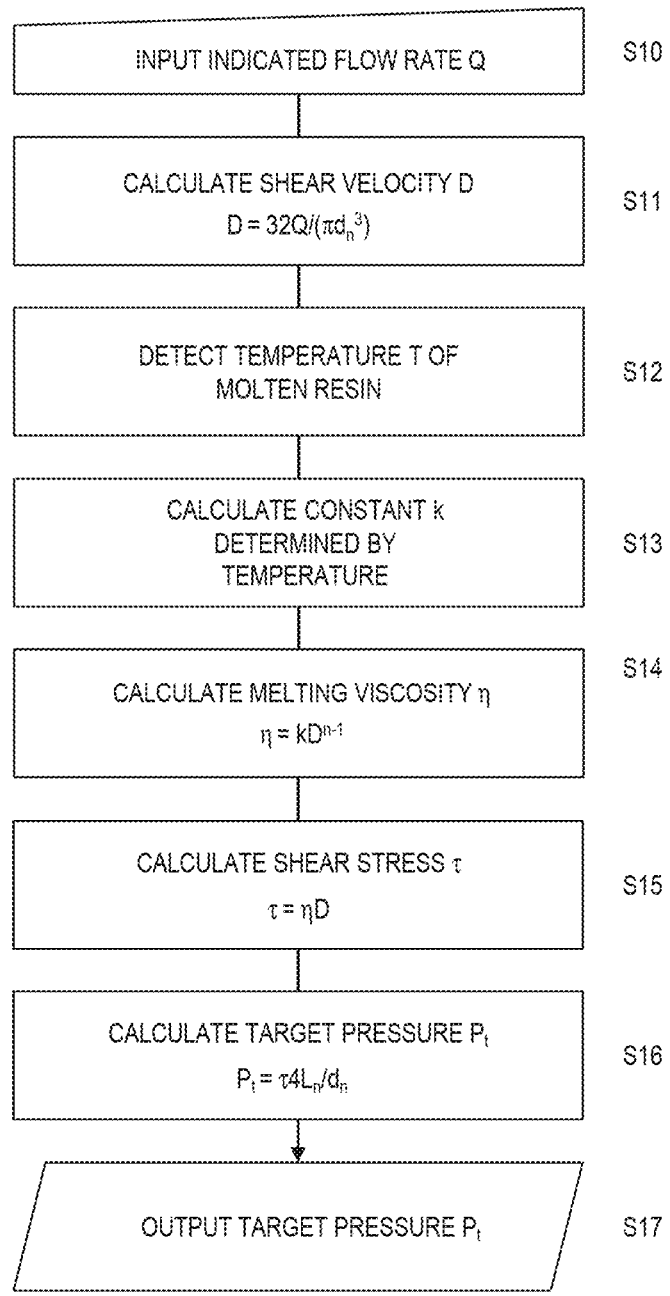
FIG. 21 is a flowchart of an operation example of a target pressure calculation unit.

The control device 7A calculates a target pressure according to a flowchart of FIG. 21 so as to obtain an indicated flow rate from a position (a position detection value), a pressure (a pressure detection value), a temperature (a temperature detection value), and values (a pseudo-plastic viscosity, a power index, a bulk modulus, and a nozzle size) stored in the storage unit (data tables 21 to 23). At that time, in the first cycle, an indicated movement speed is calculated according to a flowchart of FIG. 22, and the drive command value based on the calculated indicated movement speed is output to the motor 16a or 17a. From the second cycle, a modified bulk modulus K' is calculated according to a flowchart of FIG. 25, an indicated movement speed using the calculated modified bulk modulus K' is calculated, and a drive command value based on the calculated indicated movement speed is output to the motor 16a or 17a.

Definition of Terminology

The "indicated flow rate" is a target value (a target flow rate) of a flow rate of the molten resin discharged from the discharging nozzle 18a, and refers to the flow rate of the molten resin discharged from the nozzle 18a per unit time. The indicated flow rate Q is expressed by the following equation 4:

$$Q = \text{A cross-sectional area size of a resin bead } (=A \text{ size of a cross-sectional area of a nozzle}) \times \text{a nozzle movement speed} \quad \text{(Equation 4)}$$

Figure 16A:
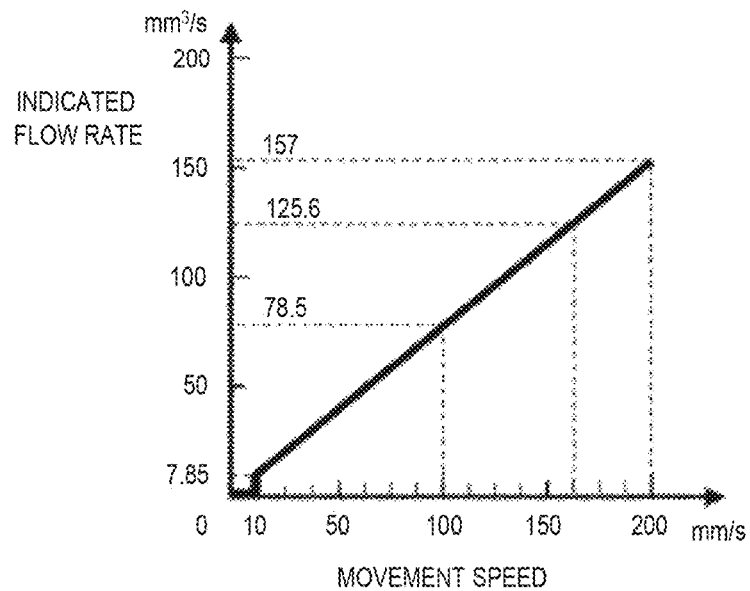
FIG. 16A is a graph displaying a relationship between a nozzle movement speed and an indicated flow rate (when a diameter of the nozzle is 1 mm and a diameter of a cylinder is 20 mm)
Figure 16B:
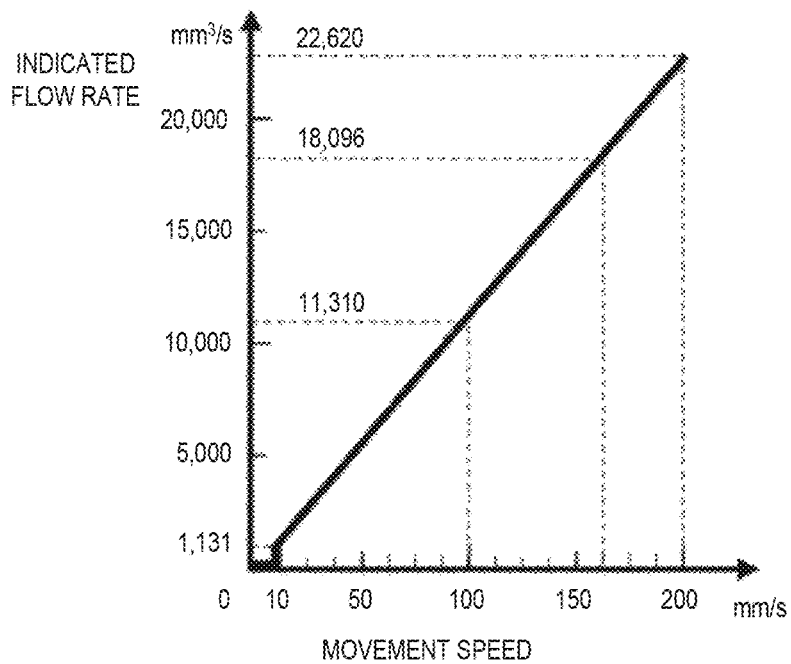
FIG. 16B is another graph displaying the relationship between the nozzle movement speed and the indicated flow rate (when the diameter of the nozzle is 12 mm and the diameter of the cylinder is 100 mm)

FIG. 16A is a graph displaying a relationship between the nozzle movement speed and the indicated flow rate (when a diameter of the nozzle is 1 mm and a diameter of the cylinder is 20 mm). In an area in which the movement speed is close to zero, when the indicated flow rate is lower than a control minimum flow rate (7.85 in FIG. 16A), the indicated flow rate may be set to zero. FIG. 16B is another graph displaying the relationship between the nozzle movement speed and the indicated flow rate (when the diameter of the nozzle is 12 mm and the diameter of the cylinder is 100 mm). In the area in which the movement speed is close to zero, when the indicated flow rate is lower than the control minimum flow rate (1,131 in FIG. 16B), the indicated flow rate may be set to zero.

The "power index" refers to a constant determined for each resin.

FIG. 17 is an example (a representative example) of the power index. As the power index, a well-known index (see, for example, Seiichi Honma, Nikkan Kogyo Shimbun, 2011, 'Plastic Product Design Method, p. 9') may be used.

The "pseudo-plastic viscosity" refers to a constant determined by a temperature for each resin. An example of obtaining the pseudo-plastic viscosity will be described.

Figure 19:
FIG. 19 is a specific example in which a relationship between a pressure and a flow rate is converted into a relationship between a shear velocity and a melting viscosity (resin name: ABS, temperature: 210° C.)
Figure 20:
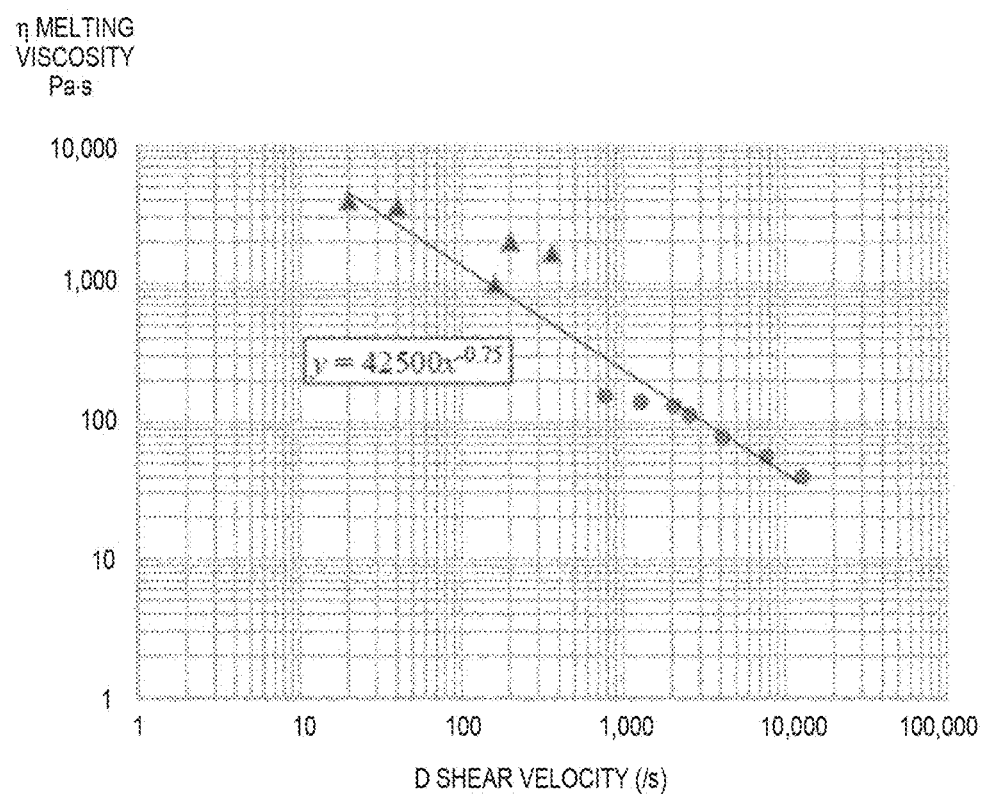
FIG. 20 is a graph in which the "shear velocity" and the "melting viscosity" in FIG. 19 are plotted.

FIG. 19 is a specific example in which a relationship between a pressure and a flow rate is converted into a relationship between a shear velocity and a melting viscosity (resin name: ABS, temperature: 210° C.). FIG. 20 is a graph in which the "shear velocity" and the "melting viscosity" in FIG. 19 are plotted.

From experiment results of FIG. 19, $y=42500x^{-0.175}$ is obtained by converting a relationship between measured pressures and measured flow rates into the relationship between shear velocities and melting viscosities, by plotting the relationship in a log-log graph as illustrated in FIG. 20, and by applying it to a power approximation formula ($y=kx^{(n-1)}$) using the method of least squares. As such, the pseudo-plastic viscosity k=42,500 is obtained. For resins other than the resin having a name of ABS and a temperature of 210° C., the pseudo-plastic viscosity can also be obtained in the same manner.

Figures 18A, 18B:
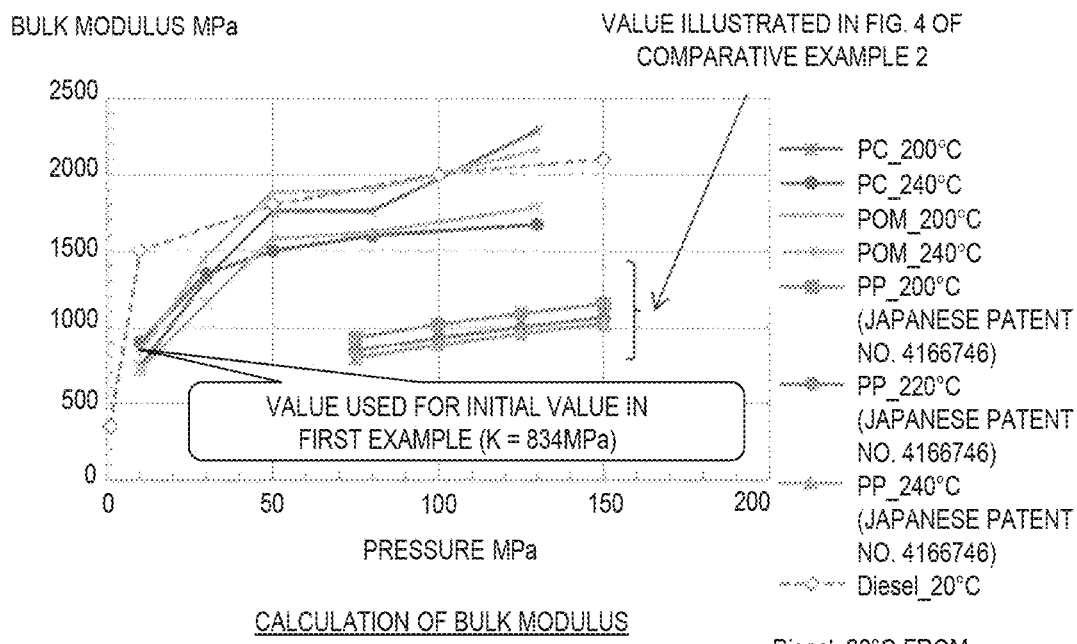

The "bulk modulus" refers to a constant determined by characteristics of the molten resin. FIG. 18A is an example of a numerical table used for calculating the bulk modulus, and FIG. 18B is a graph in which FIG. 18A is plotted.

The "target pressure" refers to a pressure applied to the molten resin accommodated (stored) in the cylinder 11 or 12 to make the flow rate of the molten resin discharged from the discharging nozzle 18a the indicated flow rate.

A "predicted outflow rate" refers to an outflow rate of the molten resin predicted to be discharged from the nozzle 18a per Δt (an interval between control times).

The "indicated movement speed" refers to a speed at which the first piston unit 14 or the second piston unit 15 is caused to move to make the flow rate of the molten resin discharged from the nozzle 18a the indicated flow rate. The first piston unit 14 and the second piston unit 15 are examples of a piston of the present disclosure. Hereinafter, the first piston unit 14 and the second piston unit 15 will also be referred to as a first torpedo 14 and a second torpedo 15, respectively. "Operating the injection molding machine" refers to discharging the resin (the molten resin).

Operation Example of Target Pressure Calculation Unit

Next, an operation example of the target pressure calculation unit 31A will be described.

The target pressure calculation unit 31A calculates the target pressure based on the indicated flow rate, the temperature of the molten resin, the pseudo-plastic viscosity, and the size of the discharging nozzle 18a.

FIG. 21 is a flowchart of an operation example of the target pressure calculation unit 31A.

First, the indicated flow rate Q is input (acquired) (step S10).

Next, a shear velocity D with respect to the indicated flow rate Q is calculated using the following equation 5 (step S11):

$$D = 32Q/(\pi d_n^3) \tag{Equation 5}$$

Here, $d_n$ is a value equivalent to a diameter (a nozzle diameter) of the minimum cross-sectional area size of the discharging nozzle 18a. π is pi. The nozzle diameter $d_n$ can be obtained from the storage unit 20.

Next, a temperature T of the molten resin immediately before the discharging is detected (step S12). The temperature T may be a temperature (a temperature detection value) directly detected by the temperature detection unit 63 (the thermocouple) or an estimated temperature. Step S12 is an example of a temperature acquisition unit of the present disclosure.

Next, the pseudo-plastic viscosity k determined by the temperature T is calculated (step S13). The pseudo-plastic viscosity k corresponding to a type and a temperature (the temperature T detected in step S12) of the resin (the molten resin) can be obtained from the k data table 21. The type of resin (molten resin) is input by, for example, a user. Step S13 is an example of a pseudo-viscosity acquisition unit of the present disclosure.

Next, a melting viscosity η is calculated using the following equation 6 (step S14):

$$\eta = kD^{n-1} \tag{Equation 6}$$

Here, n is a power index corresponding to the type of resin (molten resin). The power index n corresponding to the type of resin (molten resin) can be obtained from the n data table 22. The type of resin (molten resin) is input by, for example, a user.

Next, a shear stress τ is calculated using the following equation 7 (step S15):

$$\tau = \eta D \tag{Equation 7}$$

Next, a target pressure $P_t$ is calculated using the following equation 8 (step S16) and is output (step S17). The target pressure $P_t$ is a relative pressure in which a pressure outside the discharging nozzle 18a is set as the atmospheric pressure (zero).

$$P_t = \tau 4 L_n / d_n \tag{Equation 8}$$

Here, $L_n$ is the length (the nozzle length) of the discharging nozzle 18a (the diameter $d_n$). The nozzle length $L_n$ can be obtained from the storage unit 20.

Operation Example of Movement Speed Calculation Unit (Torpedo Movement Speed Feed Forward Control)

Next, an operation example (torpedo movement speed feed-forward control) of the movement speed calculation unit 32A will be described.

The movement speed calculation unit 32A calculates the "indicated movement speed (a first cycle of the discharging)".

Figure 22:
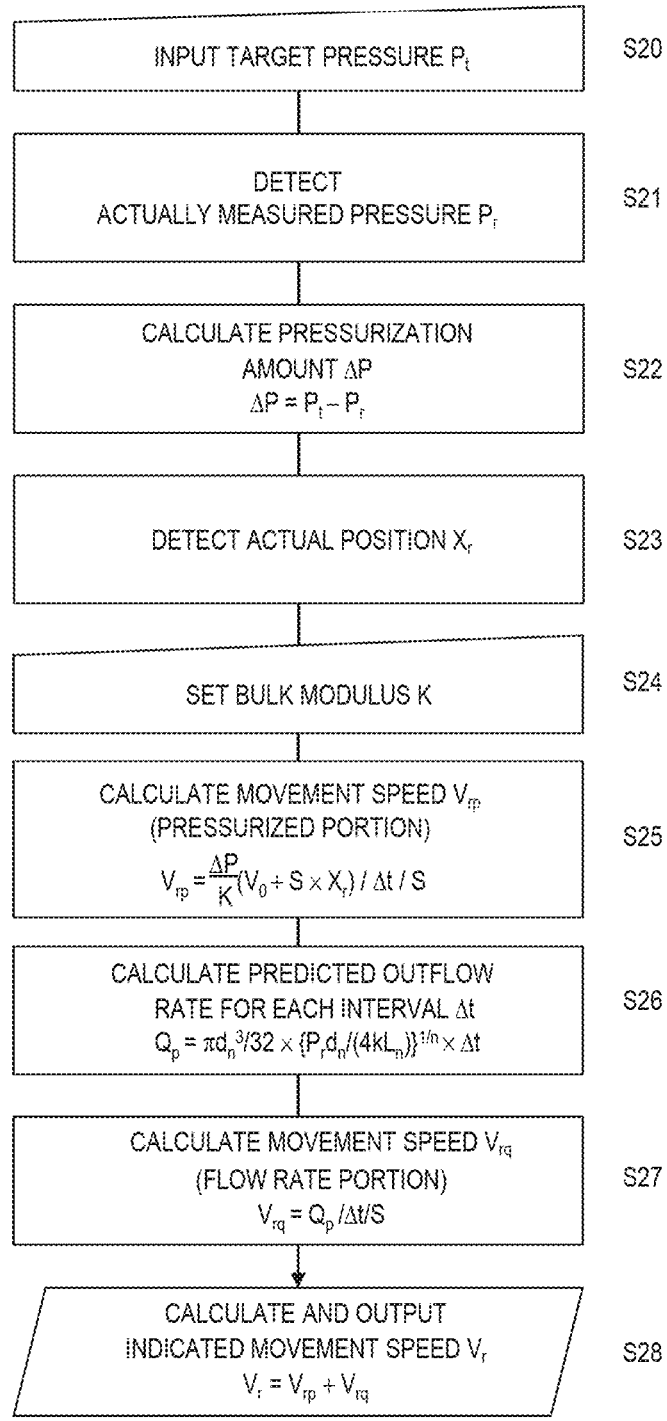
FIG. 22 is a flowchart of an operation example of a movement speed calculation unit (feedforward control of a torpedo movement speed)

FIG. 22 is a flowchart of the operation example (the torpedo movement speed feed-forward control) of the movement speed calculation unit 32A.

First, the target pressure $P_t$ calculated in step S16 and output in step S17 is input (acquired) (step S20).

Next, an actually measured pressure $P_r$ is detected (step S21). The actually measured pressure $P_r$ refers to detection values (pressure detection values) of the first pressure detection unit 65 and the second pressure detection unit 66.

Next, a pressurization amount ΔP is calculated using the following equation 9 such that the pressure becomes the target pressure $P_t$ and is output (step S22).

$$\Delta P = P_t - P_r \tag{Equation 9}$$

Next, an actual position $X_r$ is detected (step S23). The actual position $X_r$ refers to detection values (position detection values) of the potentiometers 16f, 17f.

Next, the bulk modulus K corresponding to the type of resin (molten resin) is set (step S24). For example, in the first cycle of the discharging, the bulk modulus K corresponding to the type of resin (molten resin) is obtained from the K data table 23. The type of resin (molten resin) is input by, for example, a user.

Next, $V_{rp}$, which is a pressurized portion of the movement speed of the first torpedo 14 (or the second torpedo 15) is calculated using the following equation 10 (step S25). In the following equation 10, the outflow (discharging) of the molten resin by pressurization will not be considered.

[Formula 1]

$$V_{rp} = \frac{\Delta P}{K}(V_0 + S \times X_r)/\Delta t / S \tag{Equation 10}$$

Figure 23:
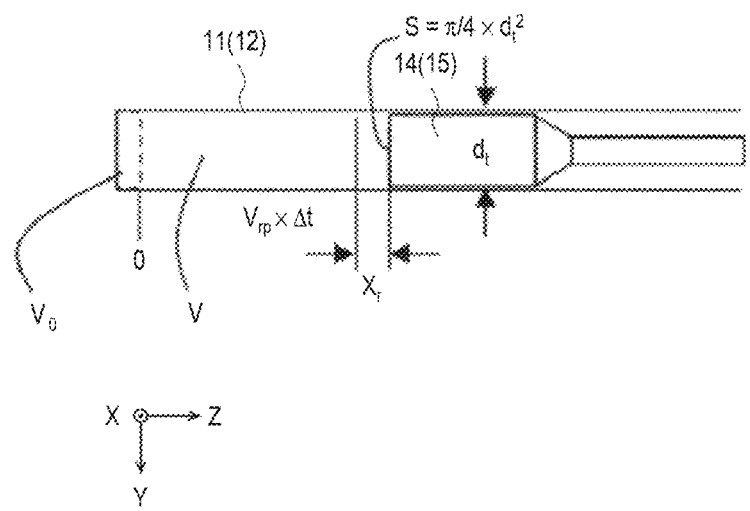
FIG. 23 is a schematic diagram illustrating each element of an equation 10.

Here, ΔP=K×ΔV/V, ΔV=$V_{rp}$×Δt×S (S is a size of the cross-sectional area of the first torpedo 14 (or the second torpedo 15), Δt is the interval between control times), V=$V_0$+S×$X_r$ (V is a pressurized volume when the first torpedo 14 (or the second torpedo 15) is positioned at $X_r$, and $V_0$ is a dead volume), and S=π/4×$d_t$ ($d_t$ is the diameter of the first torpedo 14 (or the second torpedo 15)). Each of these elements can be illustrated as in FIG. 23. FIG. 23 is a schematic diagram illustrating each element of the equation 10.

Next, a predicted outflow rate $Q_p$ is calculated using the following equation 11 (step S26):

$$Q_p = \pi d_n^3 / 32 \times \{P_t d_n/(4kL_n)\}^{1/n} \times \Delta t \tag{Equation 11}$$

The equation 11 is derived as follows. First, the equation 5 is transformed into the following equation 12:

$$Q_p = D\pi d_n^3/32 \quad \text{(Equation 12)}$$

Next, when the equations 6 and 7 are substituted into the equation 8, the following equation 13 is obtained:

$$P_r = kD^n 4L_n/d_n \quad \text{(Equation 13)}$$

The equation 13 is transformed into the following equation 14:

$$D = (P_r d_n/4kL_n)^{1/n} \quad \text{(Equation 14)}$$

When the equation 14 is substituted into the equation 12, the following equation 15 is obtained:

$$Q_p = \pi d_n^3/32 \times \{P_r d_n/(4kL_n)\}^{1/n} \quad \text{(Equation 15)}$$

Figure 24:
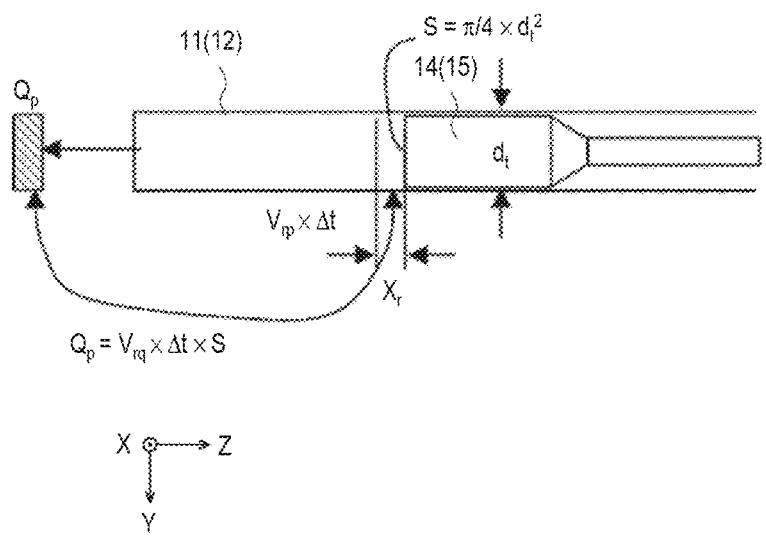
FIG. 24 is a schematic diagram illustrating each element of equations 12 to 15.

When the right side of the equation 15 is multiplied by Δt, the equation 15 becomes the equation 11. Each element in the equations 12 to 15 can be illustrated as in FIG. 24. FIG. 24 is a schematic diagram illustrating each element in the equations 12 to 15.

Next, $V_{rq}$, which is a flow rate portion of the movement speed of the first torpedo 14 (or the second torpedo 15), is calculated using the following equation 16 (step S27):

$$V_{rq} = Q_p \Delta t/S \quad \text{(Equation 16)}$$

Next, the indicated movement speed $V_r$ is calculated using the following equation 17 and is output (step S28):

$$V_r = V_{rp} + V_{rq} \quad \text{(Equation 17)}$$

Operation Example after Second Cycle of Discharging (Method of Improving Accuracy of Torpedo Movement Speed Prediction)

Next, an operation example (a method of improving the accuracy of the torpedo movement speed prediction) after the second cycle of the discharging will be described.

After the second cycle of the discharging, the movement speed calculation unit 32A calculates the "indicated movement speed (after the second cycle of the discharging)". At that time, a pressure change amount generated as a result of the movement of the first torpedo 14 (or the second torpedo 15) is obtained from the actually measured pressure, a "substantially pressurized volume" is obtained by subtracting the outflow rate calculated using the actually measured pressure in the equation 11 from a volume change amount caused by the movement of the first torpedo 14 (or the second torpedo 15), a modified bulk modulus is obtained from the pressure change amount and the "substantially pressurized volume", and these are used for calculating the indicated movement speed (see steps S32, S33 described below). As such, it is possible to use a predicted value (the modified bulk modulus) that reflects the bulk modulus according to a condition of the air entraining into the molten resin, thereby improving the accuracy.

Figure 25:
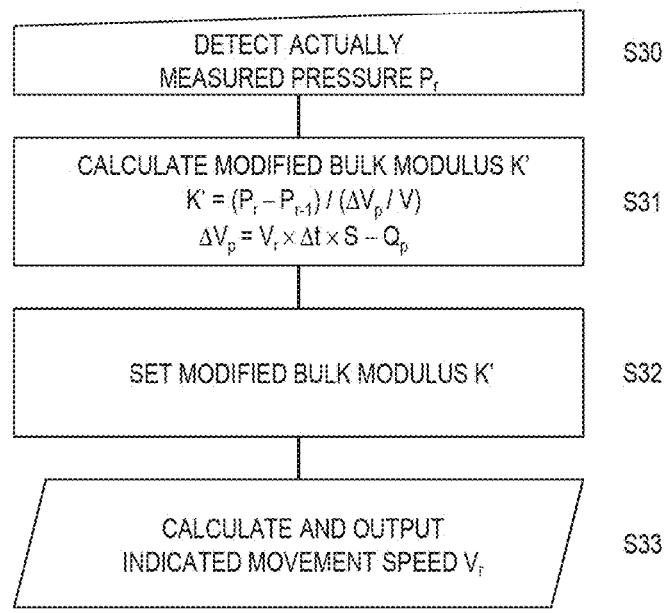
FIG. 25 is a flowchart of an operation example after a second cycle of discharging.

FIG. 25 is a flowchart of an operation example after a second cycle of the discharging.

First, the actually measured pressure $P_r$ is detected (step S30). The actually measured pressure $P_r$ refers to the detection values (the pressure detection values) of the first pressure detection unit 65 and the second pressure detection unit 66.

Next, the modified bulk modulus calculation unit 34A calculates the modified bulk modulus K' using the following equation 18 (step S31):

$$K' = (P_r - P_{r-1})/(\Delta V_p/V) \quad \text{(Equation 18)}$$

Here, $P_r$ is the actually measured pressure when the modified bulk modulus is calculated in a case where the interval Δt between control times is used. $P_{r-1}$ is the actually measured pressure before the interval Δt, and $\Delta V_p$ is the "substantially pressurized volume" obtained by subtracting the outflow rate from a volume that shrinks as the first torpedo 14 (or the second torpedo 15) moves during the interval Δt.

$\Delta V_p$ is calculated using the following equation 19:

$$\Delta V_p = V_r \times \Delta t \times S - Q_p \quad \text{(Equation 19)}$$

Figure 26:
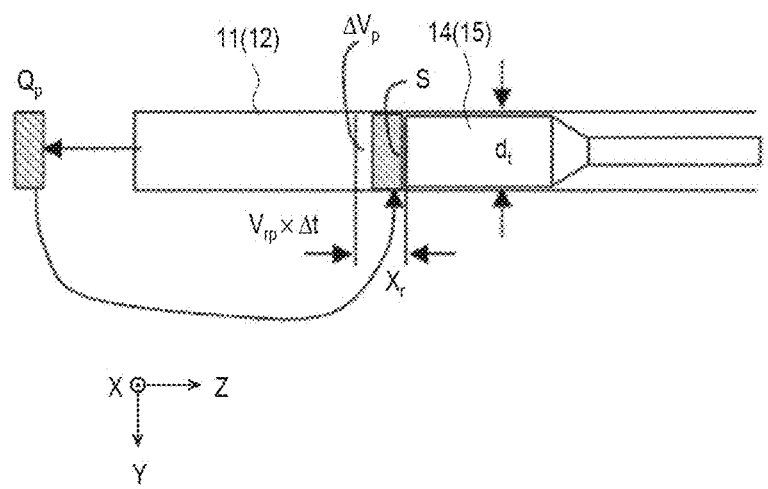
FIG. 26 is a schematic diagram illustrating each element in equations 18 and 19.

Each element in the equations 18 and 19 can be illustrated as in FIG. 26. FIG. 26 is a schematic diagram illustrating each element in the equations 18 and 19.

Next, the movement speed calculation unit 32A sets the modified bulk modulus K' as the bulk modulus K' of the second cycle (step S32). Next, the movement speed calculation unit 32A calculates and outputs the indicated movement speed $V_r$ in the same manner as in the first cycle (steps S25 to S28) (step S33).

Operation Example of Movement Speed Control Unit

The movement speed control unit 33A controls the motor 16a or 17a such that the movement speed of the first torpedo 14 (or the second torpedo 15) becomes the indicated movement speed $V_r$ that is calculated and output in step S28 (the first cycle of the discharging). Specifically, the movement speed control unit 33A outputs a drive command value to the motor 16a or 17a such that the movement speed of the first torpedo 14 (or the second torpedo 15) becomes the indicated movement speed $V_r$. Further, the movement speed control unit 33A controls the motor 16a or 17a such that the movement speed of the first torpedo 14 (or the second torpedo 15) becomes the indicated movement speed $V_r$ that is calculated and output in step S33 (after the second cycle of the discharging). Specifically, the movement speed control unit 33A outputs a drive command value to the motor 16a or 17a such that the movement speed of the first torpedo 14 (or the second torpedo 15) becomes the indicated movement speed $V_r$.

First Example of Flow Rate Control

Next, a first example of flow rate control will be described.

The first example is a discharging control example where a small object with high resolution is printed. In the first example, in a case where the nozzle diameter is as small as φ1 mm (a cylinder diameter $d_r$=20 mm), description will be made on flow rate control and a method of controlling the nozzle 18a when the nozzle 18a with a nozzle diameter of φ1 mm is driven at the movement speed of 160 mm/s, which is a steady speed (the maximum speed that is normally used) to form an ABS resin bead with a circular cross-section of φ1 mm in a straight line.

Figure 27:
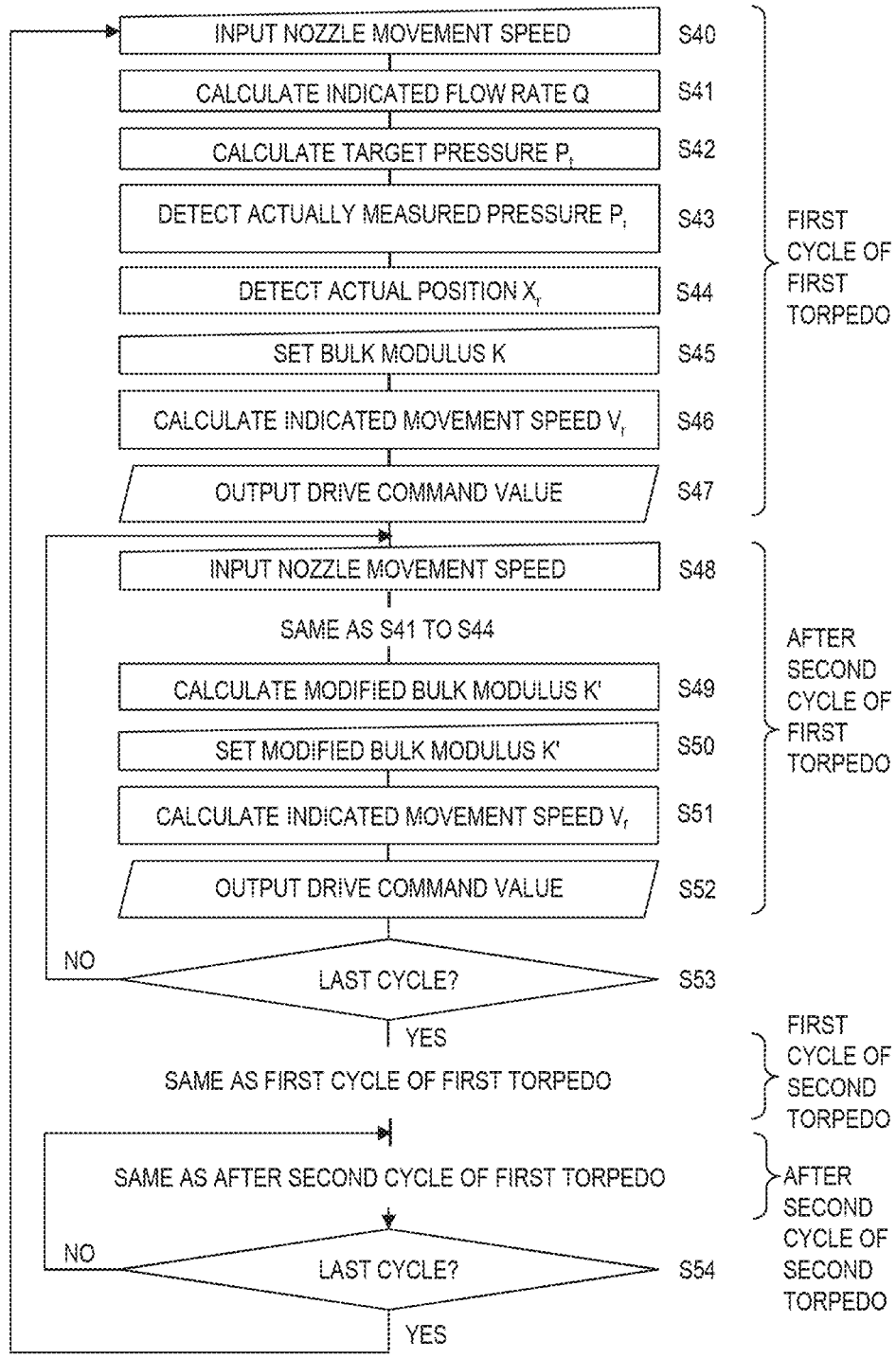
FIG. 27 is a flowchart of flow rate control common to a first example and a second example.

FIG. 27 is a flowchart common to the first example and a second example of the flow rate control. FIG. 28 is a table displaying a summary of a simulation result (first to third cycles) of the first example.

In the following description, it is assumed that the molten resin is continuously discharged from the discharging nozzle 18a as the first torpedo 14 and the second torpedo 15 alternately pressurize the molten resin in the cylinders 11 and 12 (see FIGS. 9 to 13).

Each cycle in FIG. 27 corresponds to $\Delta t$ (the interval between control times).

First, processing (steps S40 to S47) of the first cycle of the first torpedo 14 will be described.

First, the nozzle movement speed is input (step S40). Here, it is assumed that the fact that the movement speed of the nozzle 18a is 160 mm/s is detected from the XY-axis drive device 50 and input to the control device 7A.

Next, an indicated flow rate Q is input (acquired) (step S41). Here, it is assumed that the indicated flow rate Q=the cross-sectional area size of the resin bead (=the size of the cross-sectional area of the nozzle 18a)×the nozzle movement speed=$\pi/4 \times 1$ mm$^2 \times 160$ mm/s=125.6 mm$^3$/s is calculated according to the equation 4.

Next, the target pressure $P_t$ is calculated (step S42). Specifically, processing illustrated in FIG. 21 (steps S11 to S17) is executed.

First, the shear velocity D is calculated (step S11). Here, the shear velocity D=$32Q/(\pi d_n^3)$=$32 \times 125.6$ mm$^3$/s/$(3.14 \times (1$ mm$)^3)$=1,280/s is calculated according to the equation 5. Q=125.6 mm$^3$/s and $d_n$=1 mm.

Next, a temperature T of the molten resin immediately before the discharging is detected (step S12). Here, it is assumed that the temperature T=210° C. is detected.

Next, the pseudo-plastic viscosity k determined by the temperature T is calculated (step S13). Here, it is assumed that the pseudo-plastic viscosity k=42,500 [kg/(m·s$^{2-n}$)] of ABS resin at 210° C. is calculated (see FIG. 20).

Next, the melting viscosity is calculated (step S14). Here, it is assumed that the melting viscosity $\eta$=$kD^{n-1}$=42,500 kg/(m·s$^{2-0.25}$)×1,280$^{0.25-1}$/s$^{0.25-1}$=199 kg/(m·s)=199 Pa·s is calculated according to the equation 6. In the case of ABS resin, n=0.25 (see FIG. 17).

Next, the shear stress $\tau$ is calculated (step S15). Here, it is assumed that the shear stress $\tau$=$\eta D$=199 Pa·s×1,280/s=254,720 Pa=0.25 MPa is calculated according the equation 7. $\eta$=199 Pa·s and D=1,280/s.

Next, the target pressure $P_t$ is calculated (step S16). Here, it is assumed that the target pressure $P_t$=$\tau 4L/d_n$=0.25 MPa×4×2 mm/1 mm=2.0 MPa is calculated according to the above equation 8. $\tau$=0.25 MPa, L=2 mm, and $d_n$=1 mm. The target pressure $P_t$ (2.0 MPa) is output to the control device 7A (step S17).

Next, returning to FIG. 27, the actually measured pressure $P_r$ is detected (step S43). Here, it is assumed that the actually measured pressure $P_r$=0.0 MPa is detected.

Next, the pressurization amount $\Delta P$ is calculated. Here, it is assumed that the pressurization amount $\Delta P$=$P_t - P_r$=2.0 MPa–0.0 MPa=2.0 MPa is calculated according to the equation 9.

Next, an actual position $X_r$ is detected (step S44). Here, it is assumed that the actual position $X_r$=25 mm is detected.

Next, the bulk modulus K is set (step S45). Here, it is assumed that the bulk modulus K=834 MPa is set (see FIG. 18A).

Next, the indicated movement speed $V_r$ is calculated (step S46). Specifically, processing illustrated in FIG. 22 (steps S25 to S28) is executed.

First, the movement speed (the pressurized portion) $V_{rp}$ of the first torpedo 14 is calculated (step S25). Here, it is assumed that the movement speed (the pressurized portion) $V_{rp}$=(2.0 MPa/834 MPa)(628 mm$^3$+314 mm$^2 \times 25$ mm)/0.1 s/314 mm$^2$=0.647 mm/s is calculated according to the equation 10. $V_0$=628 mm$^3$, S=$\pi/4 \times d_t^2$=314 mm$^2$ ($d_t$=20 mm), and $\Delta t$=0.1 sec. $\Delta t$ is not limited to 0.1 second and may be another value.

Next, the predicted outflow rate $Q_p$ is calculated (step S26). Here, it is assumed that the predicted outflow rate $Q_p$=$\pi d_n^3/32 \times \{P_r d_n/(4kL_n)\}^{1/n} \times \Delta t$=0 mm$^3$ is calculated according to the equation 11. $P_r$=0.0 MPa.

Next, the movement speed (the flow rate portion) $V_{rq}$ of the first torpedo 14 is calculated (step S27). Here, it is assumed that the movement speed (the flow rate portion) $V_{rq}$=$Q_p/\Delta t/S$=0 mm/s is calculated according to the equation 16. $Q_p$=0 mm$^3$.

Next, the indicated movement speed $V_r$ is calculated (step S28). Here, the indicated movement speed $V_r$=$V_{rp}+V_{rq}$=0.647 mm/s+0 mm/s=0.647 mm/s is calculated according to the equation 17 and is output.

Next, the drive command value is output to the motor 16a such that the movement speed of the first torpedo 14 becomes the indicated movement speed $V_r$ calculated in step S46 (step S27) (step S47).

Next, processing after the second cycle of the first torpedo 14 (torpedo movement speed feedback control, steps S48 to S52) will be described.

First, the nozzle movement speed is input (step S48). Here, it is assumed that the fact that the movement speed of the nozzle 18a is 160 mm/s is detected from the XY-axis drive device and input to the control device 7A.

Next, the same processing as in steps S41 to S44 is executed.

Here, in step S43, it is assumed that the actually measured pressure $P_r$=1.45 MPa is detected.

Next, the modified bulk modulus K' is calculated (step S49). Here, it is assumed that the modified bulk modulus K'=$(P_r-P_{r-1})/(\Delta V_p/V)\Delta V_p$=$V_r \times \Delta t \times S - Q_p$=(1.45 MPa–0 MPa)/(20.33 mm$^3$/8,478 mm$^3$)=604.6 MPa is calculated according to the equation 18. $\Delta V_p$=0.647 mm/s×0.1 s×314 mm$^2$–0 mm$^3$=20.33 mm$^3$, $P_r$=1.45 MPa, $P_{r-1}$=0 MPa, and V=628 mm$^3$+$\pi/4 \times 202$ mm$^2 \times 25$ mm=8,478 mm$^3$. Next, the modified bulk modulus K' is set as the bulk modulus K' of the second cycle (step S50).

Next, the indicated movement speed $V_r$ is calculated in the same manner as in the first cycle (step S46) (step S51). Here, it is assumed that the indicated movement speed $V_r$=$V_{rp}+V_{rq}$=0.245 mm/s+0.103 mm/s=0.348 mm/s is calculated according to the equation 17. $\Delta P$=$P_t-P_r$=2.0 MPa–1.45 MPa=0.55 MPa, $X_r$=24.94 mm, $V_{rp}$=(0.55 MPa/604.6 MPa)(628 mm$^3$+314 mm$^2 \times 24.94$ mm)/0.1 s/314 mm$^2$=0.245 mm/s, $Q_p$=$\pi \times (1$ mm$)^3/32 \times \{1.45$ MPa×1 mm/$(4 \times 42,500$ kg/(m·s$^{2-0.25}$)×2 mm)$\}^{1/0.25} \times 0.1$ s=3.25 mm$^3$, and $V_{rq}$=3.25 mm$^3$/0.1 s/314 mm$^2$=0.103 mm/s.

Next, the drive command value is output to the motor 16a such that the movement speed of the first torpedo 14 becomes the indicated movement speed $V_r$ calculated in step S51 (step S52).

After the second cycle as well, steps S48 to S52 are repeatedly executed until it is determined that the cycle is the final cycle (step S53: YES), that is, until it is determined that the first torpedo 14 has reached the bottom dead point. Whether the first torpedo 14 has reached the bottom dead point can be determined based on the detection value (the position detection value) of the potentiometer 16f.

Next, the same processing as in steps S40 to S52 is executed until the second torpedo 15 moves to the plus side of the Z-axis and reaches the most minus side of the Z-axis (the bottom dead point) (step S54: YES).

Second Example of Flow Rate Control

Next, the second example of the flow rate control will be described.

The second example is a discharging control example in which a large automobile-sized object is printed in a short time. In the second example, in a case where the nozzle diameter is as large as φ12 mm (a cylinder diameter $d_t$=100 mm), description will be made on the flow rate control and the method of controlling the nozzle 18a when the nozzle 18a with a nozzle diameter of φ12 mm is driven at the movement speed of 160 mm/s, which is a steady speed (the maximum speed that is normally used) to form an ABS resin bead with a circular cross-section of (φ12 mm in a straight line.

FIG. 27 is a flowchart common to the first example and the second example of the flow rate control. FIG. 29 is a table displaying a summary of a simulation result (first to third cycles) of the second example.

In the following description, it is assumed that the molten resin is continuously discharged from the discharging nozzle 18a as the first torpedo 14 and the second torpedo 15 alternately pressurize the molten resin in the cylinders 11 and 12 (see FIGS. 9 to 13).

Each cycle in FIG. 27 corresponds to Δt (the interval between control times).

First, processing (steps S40 to S47) of the first cycle of the first torpedo 14 will be described.

First, the nozzle movement speed is input (step S40). Here, it is assumed that the fact that the movement speed of the nozzle 18a is 160 mm/s is detected from the XY-axis drive device 50 and input to the control device 7A.

Next, an indicated flow rate Q is input (acquired) (step S41). Here, it is assumed that the indicated flow rate Q=the cross-sectional area size of the resin bead (=the size of the cross-sectional area of the nozzle 18a)×the nozzle movement speed=π/4×122 mm²×160 mm/s=18,096 mm³/s is calculated according to the equation 4.

Next, the target pressure $P_t$ is calculated (step S42). Specifically, processing illustrated in FIG. 21 (steps S11 to S17) is executed.

First, the shear velocity D is calculated (step S11). Here, it is assumed that the shear velocity D=32×18,096 mm³/s/(3.14×(12 mm)³)=106.7/s is calculated according to the equation 5. Q=18,096 mm³/s and $d_n$=12 mm.

Next, a temperature T of the molten resin immediately before the discharging is detected (step S12). Here, it is assumed that the temperature T=210° C. is detected.

Next, the pseudo-plastic viscosity k determined by the temperature T is calculated (step S13). Here, it is assumed that the pseudo-plastic viscosity k=42,500 [kg/(m·s$^{2-n}$)] of ABS resin at 210° C. is calculated (see FIG. 20).

Next, the melting viscosity η is calculated (step S14). Here, it is assumed that the melting viscosity η=42,500 kg/(m·s$^{2-0.25}$)×106.7$^{0.25-1}$/s$^{0.25-1}$=1,280 kg/(m·s)=1,280 Pa·s is calculated according to the equation 6. In the case of ABS resin, n=0.25 (see FIG. 17).

Next, the shear stress τ is calculated (step S15). Here, it is assumed that the shear stress τ=1,280 Pa·s×106.7/s=136,576 Pa=0.14 MPa is calculated according to the equation 7. η=1,280 Pa·s and D=106.7/s.

Next, the target pressure $P_t$ is calculated (step S16). Here, it is assumed that the target pressure $P_t$=0.14 MPa×4×2 mm/12 mm=0.09 MPa is calculated according to the equation 8. τ=0.14 MPa, L=2 mm, and $d_n$=12 mm. The target pressure $P_t$ (0.09 MPa) is output to the control device 7A (step S17).

Next, returning to FIG. 27, the actually measured pressure $P_r$ is detected (step S43). Here, it is assumed that the actually measured pressure $P_r$=0.0 MPa is detected.

Next, the pressurization amount ΔP is calculated. Here, it is assumed that the pressurization amount ΔP=$P_t$−$P_r$=0.09 MPa−0.0 MPa=0.09 MPa is calculated according to the equation 9.

Next, an actual position $X_r$ is detected (step S44). Here, it is assumed that the actual position $X_r$=25 mm is detected.

Next, the bulk modulus K is set (step S45). Here, it is assumed that the bulk modulus K=834 MPa is set (see FIG. 18A).

Next, the indicated movement speed $V_r$ is calculated (step S46). Specifically, processing illustrated in FIG. 22 (steps S25 to S28) is executed.

First, the movement speed (the pressurized portion) $V_{rp}$ of the first torpedo 14 is calculated (step S25). Here, it is assumed that the movement speed (the pressurized portion) $V_{rp}$=(0.09 MPa/834 MPa)(15,700 mm³+7,854 mm²×25 mm)/0.1 s/7,854 mm²=0.029 mm/s is calculated according to the equation 10. $V_0$=15,700 mm³, S=7,854 mm² ($d_t$=100 mm), and Δt=0.1 sec. Δt is not limited to 0.1 second and may be another value.

Next, the predicted outflow rate $Q_p$ is calculated (step S26). Here, it is assumed that the predicted outflow rate $Q_p$=π$d_n^3$/32×{$P_r d_n$/(4k$L_n$)}$^{1/n}$×Δt=0 mm³ is calculated according to the equation 11. $P_r$=0.0 MPa.

Next, the movement speed (the flow rate portion) $V_{rq}$ of the first torpedo 14 is calculated (step S27). Here, it is assumed that the movement speed (the flow rate portion) $V_{rq}$=$Q_p$/Δt/S=0 mm/s is calculated according to the equation 16. $Q_p$=0 mm³.

Next, the indicated movement speed $V_r$ is calculated (step S28). Here, the indicated movement speed $V_r$=$V_{rp}$$V_{rq}$=0.029 mm/s+0 mm/s=0.029 mm/s is calculated according to the equation 17 and is output.

Next, the drive command value is output to the motor 16a such that the movement speed of the first torpedo 14 becomes the indicated movement speed $V_r$ calculated in step S46 (step S27) (step S47).

Next, processing after the second cycle of the first torpedo 14 (the torpedo movement speed feedback control, steps S48 to S52) will be described.

First, the nozzle movement speed is input (step S48). Here, it is assumed that the fact that the movement speed of the nozzle 18a is 160 mm/s is detected from the XY-axis drive device and input to the control device.

Next, the same processing as in steps S41 to S44 is executed.

Here, in step S43, it is assumed that the actually measured pressure $P_r$=0.046 MPa is detected.

Next, the modified bulk modulus K' is calculated (step S49). Here, it is assumed that the modified bulk modulus K'=($P_r$−$P_{r-1}$)/(Δ$V_p$/V)Δ$V_p$=$V_r$×Δt×S−$Q_p$=(0.046 MPa−0 MPa)/(22.88 mm³/212,049 mm³)=426.3 MPa is calculated according to the equation 18. Δ$V_p$=0.029 mm/s×0.1 s×7,854 mm²−0 mm³=22.88 mm³, $P_r$=0.046 MPa, $P_{r-1}$=0 MPa, and V=15,700 mm³+π/4×1002 mm²×25 mm=212,049 mm³.

Next, the modified bulk modulus K' is set as the bulk modulus K' of the second cycle (step S50).

Next, the indicated movement speed $V_r$ is calculated in the same manner as in the first cycle (step S46) (step S51). Here, it is assumed that the indicated movement speed $V_r$=$V_{rp}$+$V_{rq}$=0.028 mm/s+0.150 mm/s=0.178 mm/s is calculated according to the equation 17. ΔP=$P_t$−$P_r$=0.09 MPa−0.046 MPa=0.044 MPa, $X_r$=24.98 mm, $V_{rp}$=(0.044 MPa/426.3 MPa)(15,700 mm³+7,854 mm²×24.98 mm)/0.1 s/7,854 mm²=0.028 mm/s, $Q_p$=π×(12 mm)³/32×{0.046 MPa× 12 mm/(4×42,500 kg/(m·s$^{2-0.25}$)×2 mm)}$^{1/0.25}$×0.1 s=117.86 mm³, $V_{rq}$=117.86 mm³/0.1 s/7,854 mm²=0.150 mm/s.

Next, the drive command value is output to the motor 16a such that the movement speed of the first torpedo 14 becomes the indicated movement speed $V_r$ calculated in step S51 (step S52).

After the second cycle as well, steps S48 to S52 are repeatedly executed until it is determined that the cycle is the final cycle (step S53: YES), that is, until it is determined that the first torpedo 14 has reached the bottom dead point. Whether the first torpedo 14 has reached the bottom dead point can be determined based on the detection value (the position detection value) of the potentiometer 16f.

Next, the same processing as in steps S40 to S52 is executed until the second torpedo 15 moves to the plus side of the Z-axis and reaches the most minus side of the Z-axis (the bottom dead point) (step S54: YES).

As described above, according to the second embodiment, it is possible to calculate the target pressure in consideration of the type (grade), the temperature, and the nozzle size of the molten resin and control the flow rate to be discharged. This is because the movement speed control unit (an example of a pressure control unit of the present disclosure) configured to control the pressure of the molten resin in the cylinder such that the pressure thereof becomes the target pressure is included.

Further, according to the second embodiment, it is possible to accurately control the discharged flow rate of the resin by calculating the target pressure of the molten resin using the pseudo-plastic viscosity that varies depending on the temperature.

Further, according to the second embodiment, even when a plurality of resin grades is used, it is possible to accurately control the discharged flow rate of the resin by calculating the target pressure of the molten resin using the pseudo-plastic viscosity that varies depending on the resin grade.

Further, according to the second embodiment, it is possible to reduce a calculation load when calculating the target pressure by storing in advance the pseudo-plastic viscosity for each type and temperature of resins to be used.

Further, according to the second embodiment, when the movement speed control unit 33A executes feed-forward control of the movement speed of the piston (the first torpedo 14 or the second torpedo 15) using the bulk modulus of the molten resin, it is possible to more accurately control the target pressure.

Further, according to the second embodiment, it is possible to control the discharged flow rate without measuring the actual outflow rate by calculating the predicted outflow rate from the actually measured pressure and calculating the indicated movement speed of the piston (the first torpedo 14 or the second torpedo 15). Thus, it is possible to control the discharged flow rate while operating the injection molding machine.

Further, according to the second embodiment, since the modified bulk modulus calculation unit 34A that modifies the bulk modulus based on the pressure change amount calculated from the actually measured pressure and the substantially pressurized volume is included, it is possible to obtain a highly accurate flow rate according to the condition of the air entraining into the molten resin.

Further, according to the second embodiment, the modified bulk modulus calculation unit 34A modifies the bulk modulus only when a difference between the actually measured pressure and the target pressure is equal to or higher than a predetermined value. Therefore, it is possible to modify the bulk modulus only when it is necessary to correct the value of the bulk modulus.

Further, according to the second embodiment, the following advantageous effects are obtained.

The flow rate control of the resin discharging nozzle 18a described in the second embodiment may be desirably applied to a 3D printer in which a resin bead (the molten resin discharged from the nozzle 18a and solidified like a thread) is formed and laminated from the resin pellet material (usually, since it is in a form of being industrially distributed in a large amount, it is much cheaper than a filament used in an existing 3D printer, such as Stratasys).

For that reason, there is a possibility of solving the following four issues.

Issue 1

In the 3D printer (the injection molding machine 2A or the injection molding apparatus 1 including the injection molding machine 2A), even when the movement speed of the nozzle 18a is changed, it is necessary to be able to form resin beads having uniform thicknesses. In other words, it is required to detect the movement speed and swiftly respond to the corresponding flow rate.

Issue 2

In the resin nozzle assumed by the present disclosure, it is difficult to measure the actual flow rate of the resin discharging nozzle while operating the 3D printer. For this reason, in general, a method of controlling by a measured value of the resin discharging pressure is adopted.

Issue 3

However, the present inventors have found that the actual flow rate considerably varies depending on the type of resin material, the temperature of the molten resin, or the diameter of the discharging hole even when the pressure is the same. Since the melting viscosity is low at a high temperature, the flow rate is easily increased with respect to the pressure. Further, the larger the nozzle diameter, the smaller a range influenced by wall friction, and thus apparent viscosity is decreased and the flow rate is easily increased with respect to the pressure. Further, since the molten resin is a non-Newtonian fluid, the larger the flow rate, the lower the apparent viscosity, and thus the flow rate is easily increased. It is desirable that the 3D printer can handle various types of resins, various temperatures of molten resins, or extremely small diameters (for example, $\phi 0.5$ mm) to large diameters (for example, $\phi 12$ mm) of discharging holes as one device. For example, when a case of modeling a small object, such as a pen case, is compared with a case of modeling a large object, such as a minivan, a time required for one layer of additive manufacturing changes. Therefore, it is necessary to change the temperature of the resin or the nozzle diameter.

Issue 4

The present inventors have found the following issue. As an issue of using the resin pellet material, the plasticization processing varies for each stroke depending on a filling condition of the pellets and the like. As a result, the actual pressure rise varies depending on the molten state (the condition of the air entraining into the molten resin) even when compressed volumes are the same (this is caused by a difference in bulk modulus), and as a result, the flow rate also varies.

In the second embodiment, in order to solve issues 1 to 4, the target pressure used for discharging the indicated flow rate calculated from the movement speed is calculated by storing in advance, in the data tables 21 to 23 as constants, material property values with respect to various types of resins or temperatures of various molten resins, inputting a type of resin to be filled, measuring a temperature of a molten resin, and inputting a corresponding constant and a diameter of a discharging hole of a nozzle mounted (a nozzle diameter). As such, issues 1 and 3 are solved.

Next, the pressure is controlled by a movement speed obtained by adding the movement speed of the torpedo (the first torpedo 14 or the second torpedo 15) that generates a pressurizing amount calculated from the difference from the actually measured pressure to the movement speed of the torpedo corresponding to the outflow rate while the torpedo is moving, such that the pressure becomes the target pressure. Since it is difficult to directly measure the outflow rate, the flow rate predicted from the actually measured pressure is used. When calculating the movement speed of the torpedo that generates the pressurization amount, in the cycle at which the discharging is started (for example, the first cycle of the first torpedo in FIG. 27), the feed-forward control is used using a corresponding bulk modulus in the data table, and the target flow rate is swiftly reached. As such, issue 2 is solved.

In the subsequent cycles (for example, after the second cycle of the first torpedo in FIG. 27), the pressure change amount generated as a result of the movement of the torpedo is actually measured, the volume change amount is calculated from the position detection result of the torpedo and the "substantially pressurized volume" are obtained by subtracting the outflow rate calculated using the actually measured pressure in the equation 11, from the volume change amount, the modified bulk modulus is obtained from the pressure change amount and the "substantially pressurized volume", and the indicated movement speed is calculated using the above. Therefore, it is possible to highly accurately set the flow rate according to the condition of the air entraining into the molten resin. As such, issue 4 is solved.

Next, advantageous effects of the second embodiment will be further described in comparison with comparative examples 1 to 3.

Comparative Example 1

In comparative example 1 (Japanese Patent No. 5920859), a flow rate of a resin plasticized by a screw is adjusted by a gear pump arranged immediately after the resin.

An advantageous effect of the second embodiment with respect to comparative example 1 is as follows. In the second embodiment, instead of adjusting the flow rate of the resin plasticized by the screw by the gear pump arranged immediately after the resin, the resin plasticized by the torpedo is temporarily stored in a plasticization chamber, and the flow rate is controlled by the movement speed of the torpedo controlled by an actuator at the time of discharging. Thus, the gear pump at the tip of a nozzle of comparative example 1 or the piston member slidable back and forth so as to change the volume of an internal space of the nozzle is not required. Therefore, there is an advantageous effect in that a structure is simple and small.

Comparative Example 2

In comparative example 2 (Japanese Patent No. 4166746), when an outflow rate of a molten resin is controlled by a pressure and a temperature, a nozzle is turned to a closed state and a change characteristic of compressibility C(P, T) is obtained. An advantageous effect of the second embodiment with respect to comparative example 2 is as follows. In the second embodiment, a material property value required for calculating an indicated value for driving the actuator that controls the movement speed of the torpedo from the indicated flow rate (the target flow rate) is included as a constant in the data table in the apparatus. Therefore, there is an advantageous effect in that processing for measuring a characteristic value before the injection processing is not required.

Comparative Example 3

In comparative example 3 (JP 5-016195 A), it is assumed that a bulk modulus of a molding material is changed according to a position of a plunger, and an actual injection flow rate value of the molding material injected from a nozzle is calculated. An advantageous effect of the second embodiment with respect to comparative example 3 is as follows. There is an advantageous effect in that processing for measuring a constant ABC that determines the bulk modulus before the injection processing is not required in the second embodiment whereas it is required in comparative example 3. This is because, in the second embodiment, the bulk modulus in the data table is used only in the first cycle (for example, in the first cycle of the first torpedo in FIG. 27), but from the second cycle (for example, after the second cycle of the first torpedo in FIG. 27), the modified bulk modulus can be obtained every cycle while executing the injection processing, and the modified bulk modulus becomes a value in which the condition of the air entraining into the molten resin is taken into consideration, and thus it can have the same effect as that of comparative example 3.

A difference in the feedback control between comparative example 3 and the second embodiment will be described in I below, and a reason why the modified bulk modulus can be obtained while executing the injection processing in the second embodiment will be described in II below.

I: In comparative example 3, an "actual flow rate" (referred to as such in comparative example 3) is calculated from measurement results of a pressure and a position, and the feedback control is executed based on a difference from a target flow rate. However, the nozzle assumed in the second embodiment does not have a tool that measures the actual flow rate. For this reason, in the second embodiment (a technical idea of the present disclosure), open-loop control is executed for the flow rate after the second cycle, as well. In other words, in the present disclosure, the modified bulk modulus is obtained using the actually measured pressure, and thus prediction accuracy of the movement speed of the torpedo used for obtaining the indicated flow rate (the target flow rate) is improved.

II: In the second embodiment, the modified modulus can be obtained while executing the injection processing because, by recognizing the volume change amount due to the movement of the torpedo as a sum of the "substantially pressurized volume" (a compressed volume that contributes to raising the pressure) and an amount corresponding to the outflow rate, setting the outflow rate as the highly accurate "predicted outflow rate" calculated from the actually measured pressure in the equation 11, and setting the volume change amount due to the movement of the torpedo as a highly accurate value as well from an actual position that can be measured by position sensors (the potentiometers 16f, 17f), it is possible to highly accurately obtain the "substantially pressurized volume", which is a difference between the latter and the former while executing the injection processing (that is while moving the torpedo and causing the resin to flow out without closing the nozzle).

In the second embodiment, when obtaining the modified bulk modulus, the actually measured pressure, the volume change amount due to the movement of the torpedo, and the "predicted outflow rate" are used, but as expressed in the equation 11, the actually measured pressure is used to calculate the "actually predicted outflow rate", but the bulk modulus is not used. For this reason, it is possible to obtain the modified bulk modulus independently of the bulk modulus.

On the other hand, in comparative example 3, the bulk modulus K(z) is used in addition to the actually measured pressure P° when calculating the "actual flow rate q°'" (referred to as such in comparative example 3). Thus, even when the "substantially pressurized volume" referred to in the second embodiment is to be obtained by subtracting the "actual flow rate q°'" from the volume change amount As Z° due to the movement of the torpedo and the modified bulk modulus is obtained from the obtained substantially pressurized volume and the actually measured pressure P°, the predicted value (the modified bulk modulus) will be used in calculation processing of the predicted value (the modified bulk modulus), which will be a circular reference referred to in Excel, and thus the predicted value cannot be calculated.

Further, in the second embodiment, the target pressure with respect to the target indicated flow rate is calculated from a theoretical equation (obtained considering shear velocity dependence and temperature dependence of the melting viscosity using the power law of non-Newtonian fluids in quasi-plastic flow) in which the flow rate is determined from the viscosity and the pressure using a value obtained considering the change in the viscosity with respect to the temperature and the flow rate of the molten resin, and is used for controlling. Thus, the prediction is highly accurate and the indicated flow rate (the target flow rate) is swiftly reached. Further, by preparing the power index n for various resins in the data table and also preparing k obtained for each temperature in advance, it is possible to accurately control flow rates of various resins.

Next, modified examples will be described.

In the second embodiment, an example is described where the injection molding machine of the present disclosure is applied to the injection molding machine 2A that includes a plurality of combinations of cylinders and torpedoes (the cylinder 11, the first torpedo 14, the cylinder 12, and the second torpedo 15), but the present disclosure is not limited thereto. In other words, the injection molding machine according to the present disclosure is any injection molding machine including a cylinder that accommodates a molten resin, a discharging nozzle that is communicated with the cylinder, and a piston that discharges the molten resin from a discharging nozzle by sliding in the cylinder and pressurizing the molten resin therein. The injection molding machine according to the present disclosure may be applied to an injection molding machine (not shown) including one combination of a cylinder and a torpedo.

Further, in the second embodiment, an example is described where the injection molding machine according to the present disclosure is applied to an injection molding machine (a torpedo-type injection molding machine) in which the torpedo directly moves, but the present disclosure is not limited thereto. For example, the injection molding machine of the present disclosure may be applied to an injection molding machine (a screw-type injection molding machine) in which a configuration corresponding to a torpedo rotates.

Further, in the second embodiment, an example is described where the movement speed control unit controls the motor 16a or 17a such that the movement speed of the torpedo calculated and output in step S28 (or step S33) becomes the indicated movement speed $V_r$, but the present disclosure is not limited thereto.

For example, the movement speed of the torpedo calculated and output in step S28 (or step S33) may become the indicated movement speed $V_r$ by heating and expanding the molten resin accommodated (stored) in the first cylinder 11 and the second cylinder 12, that is, by controlling a heating temperature of the molten resin accommodated (stored) in the first cylinder 11 and the second cylinder 12.

Further, for example, in a case of a screw-type injection molding machine, by controlling the rotation speed of the configuration corresponding to the torpedo, the movement speed of the configuration corresponding to the torpedo may become the indicated movement speed $V_r$ calculated and output in step S28 (or step S33). In the above embodiments, the present disclosure is described as a hardware configuration, but the present disclosure is not limited thereto. In the present disclosure, arbitrary processing can also be implemented by causing a CPU to execute a computer program.

A program can be stored using various types of non-transitory computer-readable media and supplied to a computer. The non-transitory computer-readable medium includes various types of tangible storage media. Examples of the non-transitory computer-readable medium include a magnetic recording medium (for example, a flexible disk, a magnetic tape, and a hard disk drive), a magneto-optical recording medium (for example, a magneto-optical disk), a compact disc read-only memory (CD-ROM), a CD-R, a CD-R/W, a semiconductor memory (for example, a mask ROM, a programmable ROM (PROM), an Erasable PROM (EPROM), a flash ROM, and a random access memory (RAM)). Further, the program may also be supplied to the computer by various types of transitory computer-readable media. Examples of the transitory computer-readable medium include an electrical signal, an optical signal, and an electromagnetic wave. The transitory computer-readable medium can supply the program to the computer via a wired communication path, such as an electric wire and an optical fiber, or a wireless communication path.

What is claimed is:

1. An injection molding machine comprising:
   a cylinder that accommodates a molten resin;
   a discharging nozzle that is communicated with the cylinder;
   a piston configured to discharge the molten resin from the discharging nozzle by sliding in the cylinder and pressurizing the molten resin in the cylinder; and
   one or more processors configured to
      calculate a target pressure that is a target value used for pressurizing the molten resin in the cylinder and at which a flow rate of the molten resin discharged from the discharging nozzle becomes an indicated flow rate;
      acquire a temperature of the molten resin in the cylinder;
      acquire a pseudo-plastic viscosity corresponding to the temperature of the molten resin;
      control a pressure of the molten resin in the cylinder such that the pressure becomes the target pressure, the target pressure is calculated based on the indicated flow rate, the temperature of the molten resin, the pseudo-plastic viscosity, and a size of the discharging nozzle, the pressure of the molten resin is controlled by controlling a movement speed of the piston, and the controlling the movement speed of the piston is based on a bulk modulus of the molten resin; and modify the bulk modulus only when a difference between a pressure change amount and the target pressure is equal to or higher than a predetermined value, the pressure change amount calculated from an actually measured pressure and a substantially pressurized volume, wherein the substantially pressurized volume is calculated by subtracting an outflow rate multiplied by a predetermined interval of time from a volume that shrinks as the piston moves during the predetermined interval of time.

2. The injection molding machine according to claim 1, wherein the one or more processors are configured to acquire the pseudo-plastic viscosity corresponding to a kind and the temperature of the molten resin.

3. The injection molding machine according to claim 2, further comprising:

a memory that stores the pseudo-plastic viscosity for each kind and temperature of resins in advance, wherein the one or more processors are configured to acquire, from the memory, the pseudo-plastic viscosity corresponding to the kind and the temperature of the molten resin.

4. The injection molding machine according to claim 1, wherein the one or more processors are configured to execute feed-forward control of the movement speed of the piston using the bulk modulus of the molten resin.

5. The injection molding machine according to claim 4, wherein the one or more processors are configured to further execute the feed-forward control of the movement speed of the piston that is calculated based on a predicted flow rate.

6. The injection molding machine according to claim 1, wherein the piston is a torpedo.

7. The injection molding machine according to claim 1, wherein a plurality of combinations of the cylinder and the piston is included in the injection molding machine.

8. An additive manufacturing apparatus comprising:
the injection molding machine according to claim 1,
wherein the additive manufacturing apparatus is configured to model a three-dimensional modeled object by laminating the molten resin discharged from the discharging nozzle.

9. The injection molding machine according to claim 1, wherein the one or more processors are configured to modify the bulk modulus while the piston discharges the molten resin from the discharging nozzle.

10. The injection molding machine according to claim 1, wherein the one or more processors are configured to modify the bulk modulus based on the actually measured pressure at a start of the predetermined interval of time.

* * * * *